(12) United States Patent
Ponessa

(10) Patent No.: US 7,720,886 B2
(45) Date of Patent: May 18, 2010

(54) SYSTEM FOR GENERATING AN INFORMATION CATALOG

(75) Inventor: Steven J. Ponessa, Montgomery, NY (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 11/937,126

(22) Filed: Nov. 8, 2007

(65) Prior Publication Data

US 2008/0086350 A1 Apr. 10, 2008

Related U.S. Application Data

(63) Continuation of application No. 10/806,964, filed on Mar. 23, 2004, now Pat. No. 7,359,909.

(51) Int. Cl.
*G06F 7/00* (2006.01)

(52) U.S. Cl. .................................................. 707/804

(58) Field of Classification Search ....................... None
See application file for complete search history.

(56) References Cited

U.S. PATENT DOCUMENTS 6,493,720 B1 12/2002 Chu et al.
6,959,268 B1 10/2005 Myers, Jr. et al.
2001/0034733 A1* 10/2001 Prompt et al. ............... 707/102
2002/0049790 A1 4/2002 Ricker et al.
2002/0184116 A1 12/2002 Tam et al.
2003/0014447 A1 1/2003 White
2003/0149706 A1 8/2003 Neal et al.
2003/0159111 A1* 8/2003 Fry ............................ 715/513

OTHER PUBLICATIONS

Microsoft Computer Dictionary, Fifth Edition, Microsoft Press, 2002.

* cited by examiner

*Primary Examiner*—Tim T. Vo
*Assistant Examiner*—Aaron Sanders
(74) *Attorney, Agent, or Firm*—Schmeiser, Olsen & Watts; Anna L. Linne

(57) ABSTRACT

A computer system and computer program product for generating and displaying an information catalog relating to a business model. The method includes accessing technical metadata from a data warehouse, accessing business metadata from a first source outside of the data warehouse, accessing presentation metadata from a second source outside of the data warehouse, and applying the presentation metadata to the technical metadata and the business metadata to generate the information catalog. The information catalog comprises the technical metadata and the business metadata in accordance with the presentation format specified by the presentation metadata. The technical metadata is associated with data used by computer applications. The computer applications support business processes of the business model.

14 Claims, 33 Drawing Sheets

Root Element in XML Document.

```
<?xml version="1.0"?>
<info-catalog
    rootname="ICCExample"
    xmlns:xsi="http://www.w3.org/2000/10/XMLSchema-instance"
    xsi:noNamespaceSchemaLocation="file:///ICC.xsd"
    documenttitle="Information Catalog Compiler, Example, v 1.0"
    header="Data Warehouse Name Std. Ed. v1.0"
    contact="contact-address@your.site.com"
    columnXRef="no"
    sortByColumnName="no"
    security="IBM internal use only"
>
```

*FIG. 5*

Defined Elements in XML Document

```
<creators>
    <name>c1</name>
    <name>c2</name>
</creators>
<description>
    <p>
      This element should contain a description of the
      Data Warehouse's overall functionality.  Any
      standard, well-formed HTML can be contained within
      the description element; this may include lists,
      tables, images, links, or multimedia objects.
    </p>
</description>
<footer>
    <p>
              <br/>This catalog was generated by IBM
        Global Service IS&LS InfoCatalog Compiler
        on &systime;.
    </p>
</footer>
<bottom>
    <p>For further reference documentation, see
            <a href="http://your.site.com/any-
        document">Any other documents</a>. Any
        standard, well-formed HTML can be contained at
        the bottom.
    </p>
</bottom>
```

*FIG. 6*

XML Code For A Portion Of The Business Model of FIG. 2

```xml
<subjectarea>Business Process/Subject Area 3>
    <application>
        <name>Operational Application 3</name>
        <abbr>APPL-3</abbr>
        <label>APPL-3</label>
        <desc>
            <p>
                This section can contain significant detail,
                graphics, even video.  As long as the content
                is marked up in well formed HTML
            </p>
        </desc>
    </application>
    <application>
        <name>Operational Application 4</name>
        <abbr>APPL-4</abbr>
        <tablelist>
            <table>
                <creator>C2</creator>
                <name>T2</name>
            </table>
            <table>
                <creator>C2</creator>
                <name>T3</name>
            </table>
            <table>
                <creator>C2</creator>
                <name>T4</name>
            </table>
        </tablelist>
        <desc>
            <p>
                This section can contain significant detail,
                graphics, even video.  As long as the content
                is marked up in well formed HTML
            </p>
        </desc>
    </application>
    <application>
        <name>Operational Application 5</name>
        <abbr>APPL-5</abbr>
        <tablelist>
            <table>
                <creator>C2</creator>
                <name>T5</name>
            </table>
        </tablelist>
        <desc>
            <p>
                This section can contain significant detail,
                graphics, even video.  As long as the content
                is marked up in well formed HTML
            <p>
```

*FIG. 7*

Sample Lines Of "build-table-summary.xsl" File

```
1    <xsl:template match="info-catalog" mode="build-table-
     summary">

2      <xsl:variable name="curDir" select="@rootname"/>

3      <xsl:for-each select="creator">
4        <xsl:variable name="creatorNumber"
     select="position()"/>
5        <xsl:variable name="creatorName"
     select="position()"/>

6        <xsl:for-each select="table">
7          <xsl:variable name="tableNumber"
     select="position()"/>
8          <xsl:variable name="priorTableNumber"
     select="position()-1"/>
9          <xsl:variable name="nextTableNumber"
     select="position()+1"/>
10         <redirect:write select="concat($curDir,
     $fileSep, 'creator', $fileSep, $creatorName,$fileSep,
     $tableName, '-summary.html')">

11         <html lang="en-US"
     xmlns="http://www.w3.org/1999/xhtml">
12         <!--
     ******************************************
           Add Navigator
           use template icc-navigator defined in
     icc-style.

******************************************-->
13         <xsl:call-template name="icc-navigator">
14           <xsl:with-param name=" creator-number "
     select="$creatorNumber "/>
15           <xsl:with-param name=" creator-number "
     select="$tableNumber "/>
16           <xsl:with-param name="title"
     select="../title"/>
17           <xsl:variable name="type" select="'Table'"/>
18         </xsl:call-template>

19         <body bgcolor="#ffffff" marginheight="0"
     marginwidth="0" leftmargin="0" topmargin="0"
     onUnload="xclosepopup()">
           ...
           </body>
         </redirect:write>
       </xsl:for-each>
     </xsl:for-each>
   </xsl:template>
```

*FIG. 8*

Explanations of Lines 1-9 of FIG. 8.

| Line | Explanation |
|---|---|
| 1 | Defines the template by name and mode. Thus the XSL <xsl:apply-template select="info-catalog" mode="build-table-summary"/> would match this template and the XML would begin rendering from the root element "info-catalog". |
| 2 | Set the variable currDir to the value of the rootname attribute of the info-catalog element. This variable will be used to specify the qualified file name the output should be written to. |
| 3 | Begins a loop that will process each table creator XML element within the XML stream (note that information pulled from the RDBMS's system catalog is internally represented in XML). |
| 4 | Set variable to retain the relative number of the current creator. This variable will be used to derive the prior and next table when processing individual table information. |
| 5 | Set variable to retain the current creator name. This variable will be used when processing tables for each creator and to specify the qualified file name the output should be written to. |
| 6 | Begins a loop that will process each table XML element within the table creator XML element. |
| 7 | Set variable to retain the relative number of the current table. This is subsequently used to derive the prior and next table. |
| 8 | Set variable to retain the relative number of the prior table. This is subsequently used to derive the prior and next table. |
| 9 | Set variable to retain the relative number of the next table. This is subsequently used to derive the prior and next table. |

*FIG. 9A*

Explanations of Lines 10-19 of FIG. 8.

| Line | Explanation |
|---|---|
| 10 | Begin a redirected write element to redirect all output contained within the element to the qualified file specified. In the example presented herein, running on an Windows platform, this would be ICCExample\creator\C*x*\T*y*-summary.html |
| 11 | Output the first line of rendered HTML, that being the initial HTML tag. |
| 12 | Comment (lines) |
| 13 | Begin the apply/call the template element to render the common top navigation bar. The template's name is icc-navigator. Note that no mode is specified, since all detail pages have a common navigator bar. By means of being included in the redirected write element, the resulting rendered navigator bar will be written to the redirected file. |
| 14 | Pass the creator number to the icc-navigator template by means of a template parameter. |
| 15 | Pass the table number to the icc-navigator template by means of a template parameter. |
| 16 | Pass the value of the title "ancestor" element to the icc-navigator template by means of a template parameter. The "../" is used to match the element to an ancestor of the table element. |
| 17 | Pass the literal value of 'Table' to the icc-navigator template by means of a template parameter. This tells the template that the navigator bar will be used for a table detail page. |
| 18 | End the apply template element. |
| 19 | Write out the HTML body tag. |

*FIG. 9B*

Transformation Template

```
1    <xsl:template match="table">
2       <table>
3          <xsl:for-each select="@*">
4             <xsl:attribute name="{name()}">
5                <xsl:value-of select="."/>
6             </xsl:attribute>
7          </xsl:for-each>
8          <xsl:for-each select="table-row | tr">
9             <tr>
10            <xsl:for-each select="@*">
11               <xsl:attribute name="{name()}">
12                  <xsl:value-of select="."/>
13               </xsl:attribute>
14            </xsl:for-each>
15
16            <xsl:for-each select="table-cell | td">
17               <td>
18                  <xsl:for-each select="@*">
19                     <xsl:attribute name="{name()}">
20                        <xsl:value-of select="."/>
21                     </xsl:attribute>
22                  </xsl:for-each>
23
24                  <xsl:apply-templates select="*|text()" />
25
26               </td>
27            </xsl:for-each>
28
29            </tr>
30         </xsl:for-each>
31      </table>
32   </xsl:template>
```

*FIG. 11*

Representation of Information Catalog To End User

| Data Warehouse Name | | Data Warehouse Name |
| :--- | :--- | ---: |
| Std. Ed. v1.0 | | Std. Ed. v1.0 |

All Tables
All Applications

| Overview Table Deprecated Index Help |
| :---: |
| PREV NEXT FRAMES NO FRAMES |

Information Catalog Compiler, Example, v1.0
Information Catalog

This document provides an overview and database specification for the Information Catalog Compiler, Example, v1.0.

See:  Description

Applications
APPL-1
APPL-2  _51_
APPL-3
APPL-4
APPL-5

Subject Area/Source Application Hierarchy:

- Business Process/Subject Area 1
  +-- APPL-1  Operational Application 1
- Business Process/Subject Area 2
  +-- APPL-2  Operational Application 2
- Business Process/Subject Area 3
  +-- APPL-3  Operational Application 3
  +-- APPL-4  Operational Application 4
  +-- APPL-5  Operational Application 5

_53_

Table Creators
C1
C2

Top

Business Process/Subject Area 1

| APPL-1 Operational Application 1 | This section can contain significant detail, graphics, even video. As long as the content is marked up in well formed HTML. |
| :--- | :--- |

All Tables
C1.T1
C1.T2
C1.T3  _52_
C1.T4
C2.T1
C2.T2
C2.T3
C2.T4
C2.T5

Top

Business Process/Subject Area 2

| APPL-2 Operational Application 2 | This section can contain significant detail, graphics, even video. As long as the content is marked up in well formed HTML. |
| :--- | :--- |

*FIG. 13*

Object List Frame.

| All Tables | All Applications |
|---|---|
| C1.T1 | APPL-1 |
| C1.T2 | APPL-2 |
| C1.T3 | APPL-3 |
| C1.T4 | APPL-4 |
| C2.T1 | APPL-5 |
| C2.T2 | |
| C2.T3 | |
| C2.T4 | |
| C2.T5 | |
| All Tables selected from Package List Frame | All Applications selected from Package List Frame |
| APPL-3 | C1 |
| C1.T2 | T1 |
| C1.T3 | T2 |
| C1.T4 | T3 |
| | T4 |
| All Tables for an application selected from Package List Frame | All Tables for a creator name selected from Package List Frame |

*FIG. 15*

Navigation Bar.

Glossary Term.

Links Contained in Overview Summary Page.

Document Title 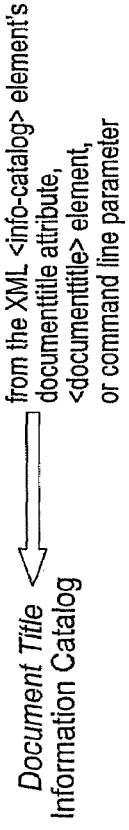 from the XML <info-catalog> element's documenttitle attribute, <documenttitle> element, or command line parameter
Information Catalog Abstract from the tag or defaulted using the <documenttitle> tag See:   *Description*   (links user to a description of the Data Warehouse's overall function, below in the page. The description is taken from the <description> tag)

Source Application Hierarchy:

- *Functional Area Name* (links user to a function area table below in the page)
  +--  *Source Appl Abbr*  Source Application Name
       (links user to an application within the function area table below in the page)
  +--  *Source Appl Abbr* repeated as needed   Source Application Name

- *Functional Area Name* repeated as needed

*Top*

| *Functional Area Name*  -  repeats for each functional area | |
|---|---|
| Source Appl Abbr Source Application Name Hyperlinked to application summary page for the source application. Repeats for each application under the functional area. | Detailed business description of the source application. |

*Top*
Document Title
Description of Data Warehouse Platform...from the <description> tag

FIG. 18

Overview Summary.

| Overview　Table　Deprecated　Index　Help | Data Warehouse Name |
|---|---|
| PREV　NEXT　　　　　　　　FRAMES　NO FRAMES | Std. Ed. v1.0 |

Information Catalog Compiler, Example, v1.0
Information Catalog

This document provides an overview and database specification for the Information Catalog Compiler, Example, v1.0.

See:
　　Description
Subject Area/Source Application Hierarchy:

- Business Process/Subject Area 1
　　+ -- APPL- 1  Operational Application 1
- Business Process/Subject Area 2
　　+ -- APPL- 2  Operational Application 2
- Business Process/Subject Area 3
　　+ -- APPL- 3  Operational Application 3
　　+ -- APPL- 4  Operational Application 4
　　+ -- APPL- 5  Operational Application 5

Top

| Business Process/Subject Area 1 | |
|---|---|
| APPL- 1<br>Operational<br>Application 1 | This section can contain significant detail, graphics, even video. As long as the content is marked up in well formed HTML. |

Top

| Business Process/Subject Area 2 | |
|---|---|
| APPL- 2<br>Operational<br>Application 2 | This section can contain significant detail, graphics, even video. As long as the content is marked up in well formed HTML. |

*FIG. 19*

Links Contained In Application Summary Page.

*Functional Area*
Application Abbreviation & Name

*Application Attributes*

| Update Frequency | e.g. nightly, weekly, 1X, 1W, realtime | Extract Method | Description of how the data is extracted, e.g. DB2 Unload, DPropR Capture. |
|---|---|---|---|
| Transformation Rule | Description of or reference to how the data is transformed, if applicable. | Population Method | Description of how the data is populated, e.g. DB2 Load, DPropR Apply. |

Description of the application from a business perspective.

Top

| Table Summary | |
|---|---|
| creator.Table Name linked to the table detail page | Business information describing the contents and purpose of the table within the source application. |

FIG. 20

Application Summary Frame.

| Overview Application Deprecated Index Help | Data Warehouse Name |
| --- | --- |
| PREV APPL  NEXT APPL    FRAMES  NO FRAMES | Std. Ed. v1.0 |

*Business Process/Subject Area 2*
APPL-2 Operational Application 2

*Application Attributes*

| Update Frequency | e.g. nightly, weekly, 1X, 1W, realtime | Extract Method | Description of how the data is extracted, e.g. DB2 Unload, DPropR Capture. |
| --- | --- | --- | --- |
| Transformation Rule | Description of or reference to how the data is transformed. | Population Method | Description of how the data is populated, e.g. DB2 Load, DPropR Apply. |

This section can contain significant detail, graphics, even video. As long as the content is marked up in well formed HTML.

Top

Table Summary

| C2.T1 | Description of table T1 with schema/creator name C2. |
| --- | --- |

| Overview Application Deprecated Index Help | Data Warehouse Name |
| --- | --- |
| PREV APPL  NEXT APPL    FRAMES  NO FRAMES | Std. Ed. v1.0 |

Submit a bug or feature
or send note to contact-address@your.site.com
For further reference and developer documentation, see Any other documents. Any standard, well formed HTML can be contained at the bottom.

This catalog was generated by IBM Global Service IS&LS InfoCatalog Compiler on Thu Jan 08 21:52:07 EST 2004.

*FIG. 21*

Format For Table Attributes.

Table Attributes

| Cardinality:? | ###,### | # Pages:? | ###,### | DB Name: | database name |
|---|---|---|---|---|---|
| # Column:? | ###,### | Pct. Pages:? | ###,### | TS Name: | Tablespace name |
| # Key Columns:? | ### | # Parents:? | ### | | |
| Record Length:? | ### | # Children:? | ###,### | | |

Created: YYYY-MM-DD HH:MM:SS.ssssss

Last Altered: YYYY-MM-DD HH:MM:SS.ssssss

Last Statistics: YYYY-MM-DD HH:MM:SS.ssssss

*FIG. 22*

| Table Attributes | |
|---|---|
| Cardinality | The total number of rows in the table as of the last time statistics were gathered. The value is -1 if statistics have not been gathered or the row describes a view, alias, or temporary table. |
| # Columns | The total number of in the table or view as of the last time statistics were gathered. The value is -1 if statistics have not been gathered or 0 if the row describes an alias table. |
| # Keys Columns | The total number of columns in the in the table's primary key as of the last time statistics were gathered. The value is -1 if statistics have not been gathered or 0 if the row describes a view, alias, or temporary table. |
| Record Length | For tables, the maximum length of any record in the table.*<br>Length is 8+N+L, where:<br>• The number 8 accounts for the header (6 bytes) and the id map entry (2 bytes).*<br>• N is 10 if the table has an edit procedure, or 0 otherwise.<br>• L is the sum of the maximum column lengths. In determining a column's maximum length, add a byte for the null indicator if the column allows nulls. Add 2 bytes for its length indicator if the column has a varying length data type (e.g. VARCHAR).<br>The value is 0 if the row describes a view or alias. |
| # Pages | The total number of pages on which rows of the table appear as of the last time statistics were gathered. The value is -1 if statistics have not been gathered or the row describes a view, alias, or temporary table. |
| Pct. Pages | Percentage of active table space pages that contain rows of the table. A page is termed active if it is formatted for rows, regardless of whether it contains any. If the table space is segmented, the percentage is based on the number of active pages in the set of segments assigned to the table. The value is -1 if statistics have not been gathered or the row describes a view, an alias, or a temporary table. |
| # Parents | The number of relationships in which the table is a dependent. The value is 0 if the row describes a view, an alias, or a temporary table. |
| # Children | The number of relationships in which the table is a parent. The value is 0 if the row describes a view, an alias, or a temporary table. |
| DB Name | For a table, or a view of tables, the name of the database that contains the tablespace named in TS Name. For a temporary table, an alias, or a view of a view, the value is DSNDB06.* |
| TS Name | For a table, or a view of one table, the name of the tables space that contains the table. For a view of more than one table, the name of a table space that contains one of the tables. For a temporary table, the value is SYSPKAGE. For a view of a view, the value is SYSVIEWS. For an alias, it is SYSDBAUT.* |
| Created | The time when the CREATE statement was executed for the table, view, or alias. |
| Last Altered | For a table, the time when the last ALTER TABLE statement was applied. If no ALTER TABLE statement has been applied, or if the row is for a view or alias, ALTEREDTS has the value of CREATEDTS. |

*FIG. 23*

| Column Summary | - *table-name* |
|---|---|
| *Column Name* | Business Description of Column<br>See Also:<br>*tableCreator.tableName1*, *tableCreator.tableName2*, ... *tableCreator.tableNameN* |

*FIG. 24*

Top

| Column Schema | | - *creator.table_name* | | | | | |
|---|---|---|---|---|---|---|---|
| Name | # | Type? | Length? | Scale? | Nulls? | Key Seq? | Cardinaility? |
| *Column Name* | ## | *data type* | ## | ## | *Nulls* | ## | ###, ### |

*FIG. 25*

| Column Schema | |
|---|---|
| Column Name | Name of the column |
| # | Numeric place of the column within the table or view. |
| Type | The data type of the column specified in the definition of the column. |
| Length | The length attribute of the column or, in the case of a decimal column, its precision. The number does not include the internal prefixes used to record actual length and null state, where applicable. |
| Scale | Scale of decimal data. Zero if not a decimal column. |
| Nulls | Whether the column can contain null values:<br>• N  No<br>• Y  Yes<br><br>The value can be N for a view column that is derived from an expression or a function. Nevertheless, such a column allows nulls when it is referenced in an outer select list. |
| Key Seq | Column Key Sequence Number - The column's numeric position within the table's primary key. 0 if it is not part of a primary key. |
| Cardinality | Estimated number of distinct values in the column, as of the last time statistics were gathered. The value is -1 if statistics have not been gathered or the row describes a view, alias, or temporary table. |

*FIG. 26*

Top

| Indices | - creator.table_name | | |
|---|---|---|---|
| *index_name* - key type (e.g. primary, duplicates). Repeats for every index. | | | |
| Clustering: Y/N<br>Clustered: Y/N<br>Cluster Ratio: ###? | Created on: *YYYY-MM-DD HH:MM:SS.sssss*<br>Statistics last run: *YYYY-MM-DD HH:MM:SS.sssss* | | |
| Col Name | Col # | Col Seq | Ordering |
| *column name* | ### | ### | *Asc/Descending* |

*FIG. 27*

| Indices Attributes | |
|---|---|
| Index Name | DB2 name of the index |
| Key Type | The type of index.<br>• Primary Key (unique by definition)<br>• Unique (but not primary key)<br>• Duplicates |
| Clustered, Clustering, and Cluster Ratio | Clustered<br>Indicates whether the table is actually clustered (ordered) by the index.<br>Clustering<br>Indicates whether the index was created using CLUSTER.<br>Cluster Ratio<br>The percentage of rows that are in clustering order. The cluster ration gives an indication of how closely the order of the index entries on the index leaf pages matches the actual ordering of the rows on the data pages. The closer CLUSTERRATIO is to 100%, the more closely the ordering of the index entries matches the actual ordering of the rows on the data pages.<br>The higher the ration the better the performance for queries that retrieve data in the clustering order. A value greater than 60 is considered to be good.<br><u>The importance of clustering</u><br>When a table has a clustering index, records are organized, as nearly as possible in the order of their index values. These clustered inserts can provide a significant performance advantage in some operations, particularly those that involve many records, such as grouping, ordering, and comparisons other than equal. Although a table can have several indexes, only one of them can be a clustering index.<br>Clustering can also help DB2 exploit Sequential Prefetch:<br>Sequential prefetch is performed concurrently with other operations of the originating application program. It brings pages into the virtual buffer pool before they are required and reads several pages with a single I/O operation.<br>Sequential prefetch can be used to read data pages, by table space scans or index scans with clustered data reference.<br>• Cluster Ration is an important input to the cost estimates that are used to determine whether an index is used for an access path, and, if so, which index to use.<br>• If the access is INDEXONLY, then this value does not apply.<br>• The higher the CLUSTERRATIO value, the lower the cost of referencing data pages during an index scans.<br>• For an index that has a CLUSTERRATIO less than 80%, sequential prefetch is not used to access the data pages. |
| Created on | The time when the CREATE statement was executed for the index. |
| Statistics last run | If RUNSTATS updated the statistics, the date and time when the last invocation of RUNSTATS updated the statistics for the index. The default value is '0001-01-01.00.00.00.000000'. |
| Col Name | Name of the column used in the index. |
| Col # | Numeric place of the column within the table. |
| Col Seq | Numeric place of the column within the index. |
| Ordering | Order of the column in the key.<br>• A - Ascending<br>• D — Descending |

*FIG. 28A*

| Indices Attributes | |
|---|---|
| Col # | Numeric place of the column within the table. |
| Col Seq | Numeric place of the column within the index. |
| Ordering | Order of the column in the key.<br>• A - Ascending<br>• D - Descending |

*FIG. 28B*

Top

| Relationships    - creator.table_name | | |
|---|---|---|
| with: *creator.table_name*    *(Hyperlinked to referenced table)*<br>Delete Rule: *Restrict/Delete/Cascade*<br>Created On: *YYYY-MM-DD HH:MM:SS:ssssss* | | |
| Col Name | Col # | Col Seq |
| *column name* | ### | ### |

*FIG. 29*

| Relationship Attributes | |
|---|---|
| with:<br>*creator.table_name* | Name of the table that the current table has a relationship with. This name is linked to the index section of the 'related' table. |
| Delete Rule | Type of delete rule for the referential constraint.<br>• Cascade<br>• Set Null<br>• Restrict<br>• No Action |
| Created on | The time when the CREATE statement was executed for the relationship. |
| Col Name | Name of the column used in the relationship. |
| Col # | Numeric place of the column within the table. |
| Col Seq | Numeric place of the column within the relationship. |

*FIG. 30*

| Overview | Table | Deprecated | Index | Help | Data Warehouse Name |
|---|---|---|---|---|---|
| PREV NEXT | | FRAMES | NO FRAMES | | Std. Ed. v1.0 |

Deprecated Tables

This page lists all of the Information Catalog Compiler, Example, v1.0 tables that have been deprecated. A deprecated table is not recommended for use, generally due to improvements, and a replacement table is usually given. Deprecated tables may be removed in future implementations of the Information Catalog Compiler, Example, v1.0.

| Deprecated Tables | |
|---|---|
| *creator-name.TABLE-NAME* | Business description of table.<br>Replaced with:<br>*creator-name.TABLE-NAME1*, ... , *creator-name.TABLE-NAMEn* |

*FIG. 31*

| Overview  Table  Deprecated  Index  Help | Data Warehouse Name |
|---|---|
| PREV LETTER  NEXT LETTER  FRAMES  NO FRAMES | Std. Ed. v1.0 |

$ @ A B C D E F G H I J K L M N O P Q R S T U V W X Y Z

---

A

APPL-1    (Application) Operational Application 1 in function area Business Process/Subject Area 1
APPL-2    (Application) Operational Application 1 in function area Business Process/Subject Area 2
APPL-3    (Application) Operational Application 1 in function area Business Process/Subject Area 3
APPL-4    (Application) Operational Application 1 in function area Business Process/Subject Area 3
APPL-5    (Application) Operational Application 1 in function area Business Process/Subject Area 3
ATTR-1    (Column in table C1.T1)

Business definition of attr_1. Part of the primary key for C1.T1.
    Definitions can be marked up with any HTML tag for formatting, e.g., Ordered Lists
        1. Item 1
        2. Item 2

ATTR-1    (Column in table C1.T2)
    Business definition of attr_1. Part of the primary key for C1.T2.

ATTR-1    (Column in table C1.T3)
    Business definition of attr_1. Part of the primary key for C1.T3.

ATTR-1    (Column in table C1.T4)
    Business definition of attr_1. Part of the primary key for C1.T4.

*FIG. 32*

SYSTEM FOR GENERATING AN INFORMATION CATALOG

This application is a continuation application claiming priority to Ser. No. 10/806,964, filed Mar. 23, 2004 now U.S. Pat. No. 7,359,909.

BACKGROUND OF THE INVENTION

1. Technical Field

The present invention relates to a method, computer system, computer program product and graphical interface for generating and displaying an information catalog based on combining technical metadata, business metadata, and presentation metadata.

2. Related Art

A decision support system exists to provide the tools and facilities to manage and deliver complete, timely, accurate, and understandable business information to authorized individuals for effective business decision making.

Data is reaching an all time high in being a critical asset for a business and within a decision support system. The data is distributed throughout multiple systems on multiple platforms and environments. In today's complex, distributed computer systems, data abounds but is often hard to come by. The data is scattered, protected with different levels of granularity by its owners, and the access capabilities, if available, differ from system to system. Data in one system often has no consistency with data on another in definition, format, and/or timeliness. This makes it difficult to combine or compare data from heterogeneous sources. In many cases, the same data exists in different data stores across multiple applications. This leads to even more problems because the question of which system has the "real" data for a piece of business information cannot be easily answered.

Data warehouses in the form of relational database systems address these problems and gather, enrich, and cleanses all this disparate data into a single, consistent source to maximize the value of a company's data assets. These analytically oriented systems can potentially improve a company's ability to rediscover and utilize information they already own and derive insight from the wealth of data available, delivering information that's conclusive, fact-based, and actionable.

Unfortunately, current decision support systems for understanding business issues and making business decisions are not adequately supported by existing data warehouses for several reasons. One reason is that the data warehouses do not include information as to how the data is used in computer applications (i.e., software) which support business processes. Another reason is that the data in a complex relational database system having a large number of relational tables is not conveniently accessible to the business-oriented end user (e.g., business manager). The data warehouse may have a system catalog containing metadata that provides information about the data in the data warehouse at a granular level. However, using the system catalog is cumbersome and difficult, since the system catalog is not intended for the business-oriented end user, but rather is intended for the system administrator.

Accordingly, there is need for a method, computer system, computer program product and graphical interface which enable business-oriented end users to more readily utilize available data in decision support systems.

SUMMARY OF THE INVENTION

The present invention provides a method for generating an information catalog relating to a business model, comprising the steps of:

accessing technical metadata from a data warehouse, said technical metadata being associated with data used by computer applications, said computer applications supporting business processes of the business model;

accessing business metadata from a first source outside of the data warehouse, said business metadata comprising relationships between the business processes and the computer applications, said business metadata further comprising relationships between the computer applications and the technical metadata;

accessing presentation metadata from a second source outside of the data warehouse, said second source being independent of the first source, said presentation metadata specifying a presentation format of the technical metadata and business metadata; and applying the presentation metadata to the technical metadata and the business metadata to generate the information catalog, said information catalog comprising the technical metadata and the business metadata in accordance with the presentation format specified by the presentation metadata.

The present invention provides a computer system comprising a processor and a computer readable memory unit coupled to the processor, said memory unit including an information catalog compiler that when executed by the processor implements a method for generating an information catalog relating to a business model, said method comprising the computer implemented steps of:

accessing technical metadata from a data warehouse, said technical metadata being associated with data used by computer applications, said computer applications supporting business processes of the business model;

accessing business metadata from a first source outside of the data warehouse, said business metadata comprising relationships between the business processes and the computer applications, said business metadata further comprising relationships between the computer applications and the technical metadata;

accessing presentation metadata from a second source outside of the data warehouse, said second source being independent of the first source, said presentation metadata specifying a presentation format of the technical metadata and business metadata; and applying the presentation metadata to the technical metadata and the business metadata to generate the information catalog, said information catalog comprising the technical metadata and the business metadata in accordance with the presentation format specified by the presentation metadata.

The present invention provides a computer program product, comprising a computer usable medium having a computer readable program code embodied therein, said computer readable program code comprising an algorithm adapted to implement a method for generating an information catalog relating to a business model, said method comprising the steps of:

accessing technical metadata from a data warehouse, said technical metadata being associated with data used by computer applications, said computer applications supporting business processes of the business model;

accessing business metadata from a first source outside of the data warehouse, said business metadata comprising relationships between the business processes and the computer applications, said business metadata further comprising relationships between the computer applications and the technical metadata;

accessing presentation metadata from a second source outside of the data warehouse, said second source being independent of the first source, said presentation metadata specifying a presentation format of the technical metadata and business metadata; and applying the presentation metadata to the technical metadata and the business metadata to generate the information catalog, said information catalog comprising the technical metadata and the business metadata in accordance with the presentation format specified by the presentation metadata.

The present invention provides a graphical interface of a computer system, comprising package list frame, an object list frame driven by the package list frame, and a detail frame driven by the object list frame, said computer system comprising a processor and a computer readable memory unit coupled to the processor, said memory unit including an information catalog compiler that when executed by the processor implements a method for generating an information catalog relating to a business model, said graphical interface adapted to being navigated by an end user of the method, said method comprising generating the information catalog by applying presentation metadata to technical metadata and business metadata such that the information catalog comprises the technical metadata and the business metadata in accordance with a presentation format specified by the presentation metadata, said technical metadata being associated with data used by computer applications supporting business processes of the business model, said package list frame including selectable applications of said computer applications and selectable associated table creators of tables relating to the technical metadata, said object list frame being adapted to include selectable tables driven by a computer application and associated table creator selected from the package list frame, said detail frame being adapted to include table information relating to a table selected from the object list frame.

The present invention advantageously provides a method, computer system, computer program product and graphical interface which enable business-oriented end users to more readily utilize available technical data in decision support systems.

BRIEF DESCRIPTION OF THE DRAWINGS

FIG. 5 depicts a sample eXtensible Markup Language (XML) document or file showing a root element and its attributes, in accordance with embodiments of the present invention.

FIG. 6 depicts defined elements in a XML document or file, in accordance with embodiments of the present invention.

FIG. 7 depicts XML code that describes the business model of FIG. 2, in accordance with embodiments of the present invention.

FIG. 8 depicts sample code from the first few significant lines of a eXtensible Stylesheet Language (XSL) file, in accordance with embodiments of the present invention.

FIGS. 9A and 9B provide explanations of numbered lines of FIG. 8, in accordance with embodiments of the present invention.

FIG. 11 depicts a sample XSL transformation template relating to rendering Hypertext Markup Language (HTML) tag containing attributes and text, such as the table (<table>) tag, from the XML sources, in accordance with embodiments of the present invention.

FIG. 13 depicts a graphical interface showing the generated information catalog representation that would first appear to an end user for the business model of FIG. 2A and database model of FIG. 2B, in accordance with embodiments of the present invention.

FIG. 15 describes the object list frame for the business model of FIG. 2A and database model of FIG. 2B, in accordance with embodiments of the present invention.

FIG. 18 depicts links contained in the overview summary page, in accordance with embodiments of the present invention.

FIG. 19 depicts the overview summary for the business model of FIG. 2A, in accordance with embodiments of the present invention.

FIG. 20 depicts links contained in the application summary page, in accordance with embodiments of the present invention.

FIG. 21 depicts an application summary frame, in accordance with embodiments of the present invention.

FIG. 22 depicts the format for table attributes, in accordance with embodiments of the present invention.

FIG. 23 is a table describing table attributes, in accordance with embodiments of the present invention.

FIG. 24 contains a column summary, in accordance with embodiments of the present invention.

FIG. 25 depicts the format of column schema, in accordance with embodiments of the present invention.

FIG. 26 is a table describing column attributes, in accordance with embodiments of the present invention.

FIG. 27 depicts table index information, in accordance with embodiments of the present invention.

FIGS. 28A-28B are tables describing indices attributes, in accordance with embodiments of the present invention.

FIG. 29 depicts relationship format, in accordance with embodiments of the present invention.

FIG. 30 is a table describing relationship attributes, in accordance with embodiments of the present invention.

FIG. 31 illustrates deprecated tables, in accordance with embodiments of the present invention.

FIG. 32 depicts an index page, in accordance with embodiments of the present invention.

DETAILED DESCRIPTION OF THE INVENTION

The detailed description of the present invention is divided into the following for sections: General Description, eXtensible Markup Language (XML) Processing, eXtensible Stylesheet Language (XSL) Processing, and Information Catalog Output.

General Description

A decision support system made available to a population of analysts and information gatherers is generally accompanied by numerous predefined reports. However, when an anomaly is identified or a trend needs analysis, the analyst is required to dive into the detailed data behind the reported numbers in an ad-hoc fashion. It is this ad-hoc analysis that makes up the majority of work within the decision support environment, and provides the most business value. However, analysts need some kind of catalog or directory about what data is available to them, what the data means within a given business context, and how a specific piece of data interrelates with other data within the environment. Without this information, the analyst is unaware of the breath and depth of the information available and how to properly use it. Without this information, the analyst cannot find the information needed to answer the business questions and/or may pull the wrong information, resulting in business decisions being driven by invalid information.

Accordingly, the present invention provides an information catalog, which is a catalog into the data warehouse. The present invention automates the building of the information catalog, using technical metadata, business metadata, and presentation metadata from independent sources, as will be described infra in conjunction with FIG. 3.

Figure 1A:
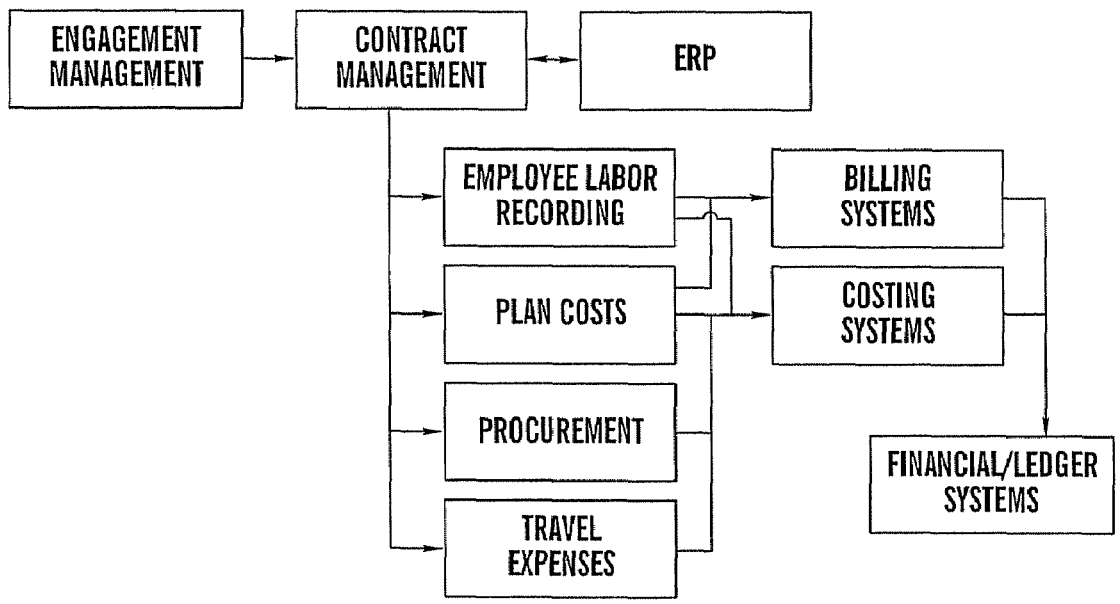
FIGS. 1A and 1B present an illustration of interrelated business processes in support of contract fulfillment, in accordance with embodiments of the present invention.
Figure 1B:
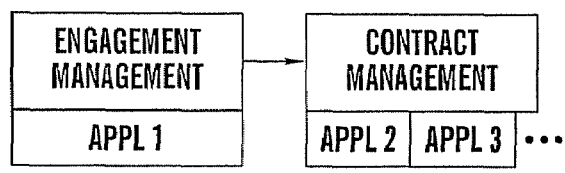

FIGS. 1A and 1B (collectively, "FIG. 1") present an illustration of interrelated business processes in support of contract fulfillment, in accordance with embodiments of the present invention. FIG. 1A shows relationships between business processes and business applications having supporting technical data and metadata in a data warehouse. A "computer application" (hereinafter, "application") is defined herein and in the claims as executable computer software such as, inter alia, a program code, program module, etc. intended to be utilized by an end user for performing a function that the end user requires (e.g., a business function relating to business analysis). An application may be a stand-alone computer program or a program module within an application software system.

In FIG. 1A, each box (e.g., "Engagement Management", "Contract Management", etc.) represents a business process. The business process ERP in FIG. 1A stands for Enterprise Resource Planning. Each business process in FIG. 1A has one-to-many computer applications supporting it. See, for example, FIG. 1B illustrating that the Engagement Management process is supported by one computer application, namely "app 1", whereas the Contract Management process is supported by two computer applications, namely "app 2" and "appl 3". Multiple computer applications may exist for a business process due to computer applications with distinct, complimentary functionality or differing by geographic, business unit, or other boundary.

The operational applications (and their data) are those applications that manage the operation of a company's business. They may be high-volume transaction applications, where fast response time and practically full-time availability are essential, and where, consequently, some frequently used data elements tend to be replicated across applications. Applications that control this data may be too vital and too busy, keeping the business moving, to be interrupted by queries from information gatherers. These applications may be distributed among multiple computers and computer platforms. Thus, the operational data is consolidated into a data warehouse for decision support utilization.

Figure 2A:
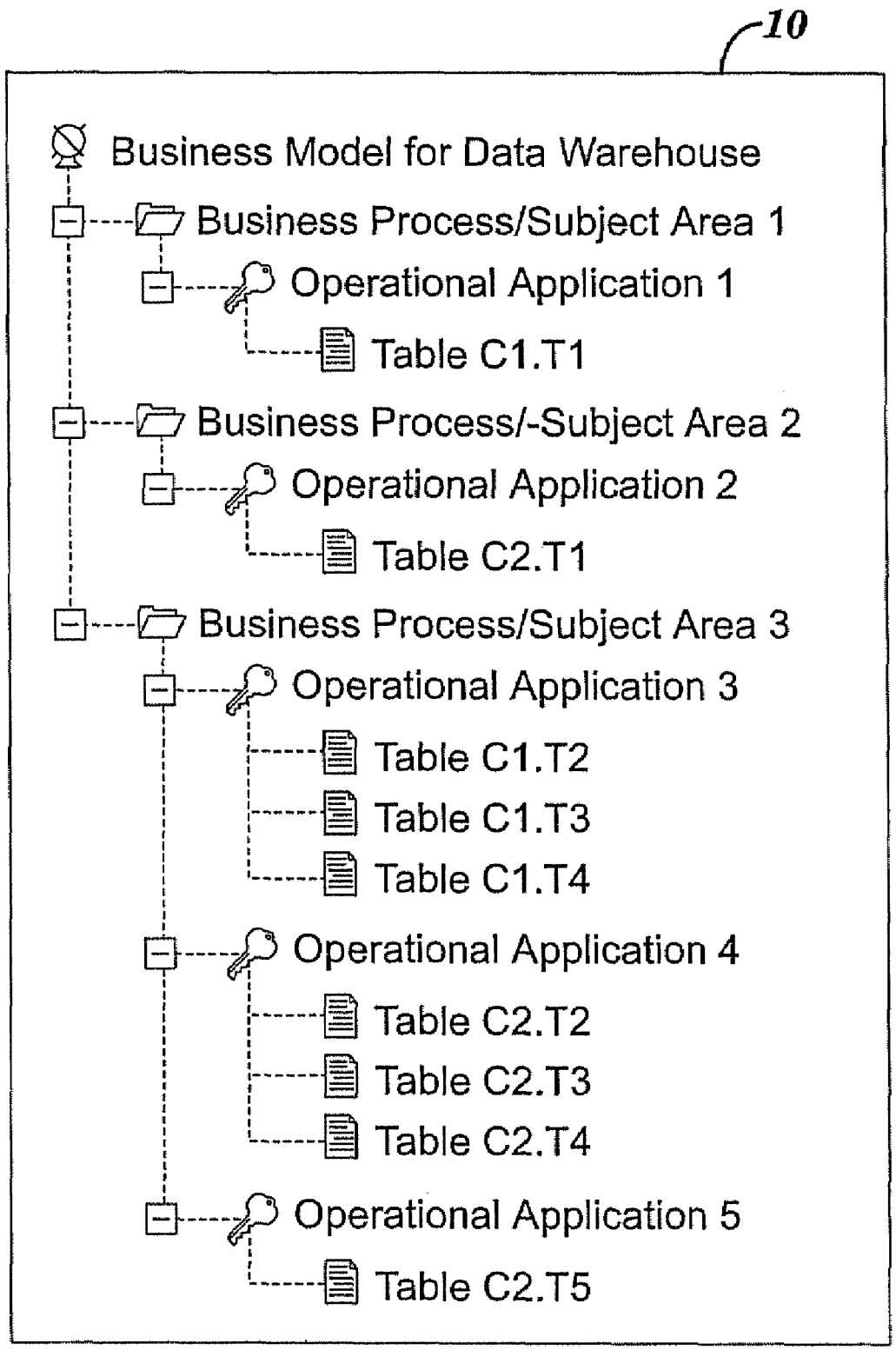
FIG. 2A depicts a business model showing logical relationships between business processes, computer application supporting the business processes, and tables utilized by the computer applications, in accordance with embodiments of the present invention.
Figure 2B:
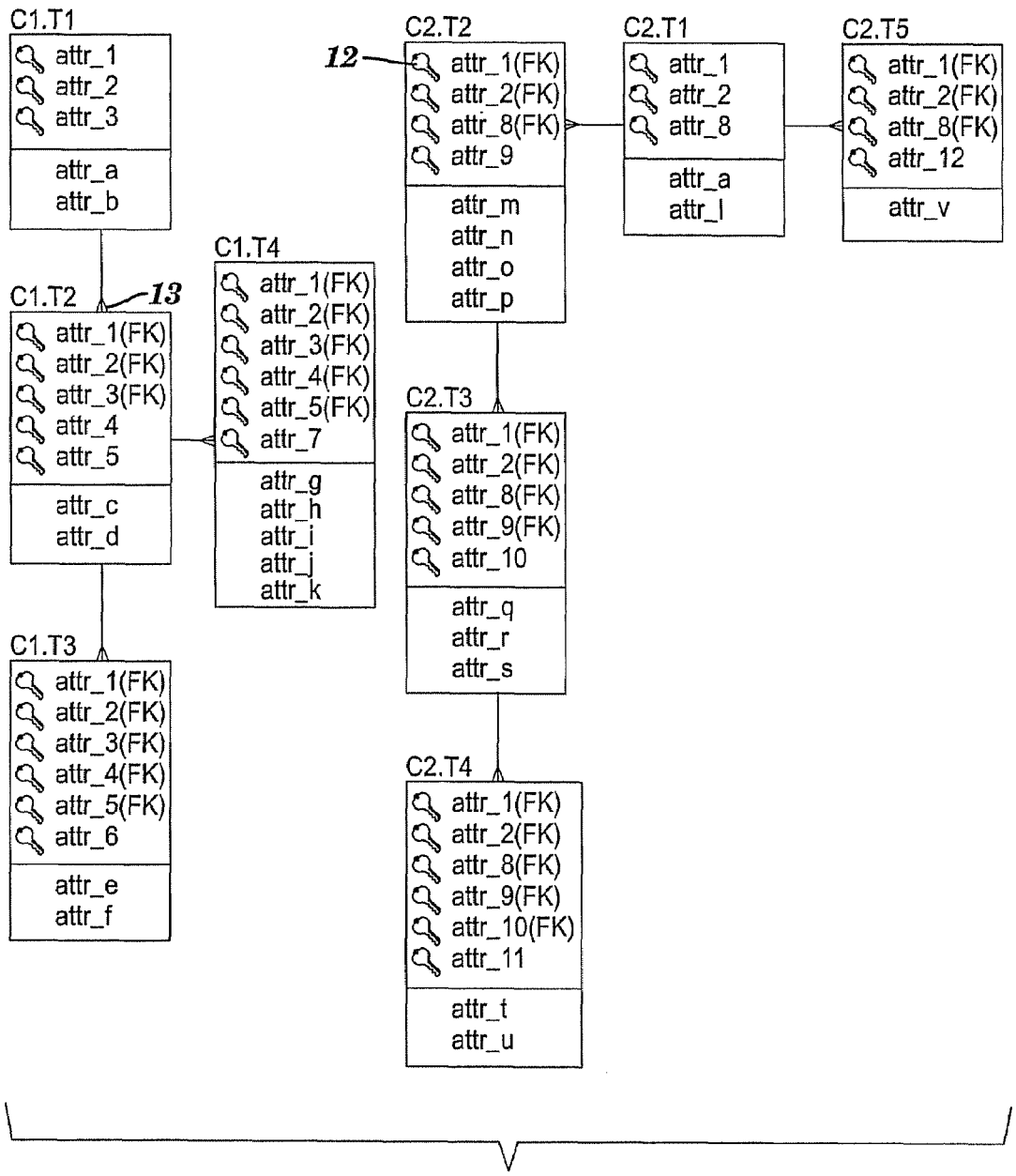
FIG. 2B depicts a physical database schema of the tables utilized by the computer applications, in accordance with embodiments of the present invention.

FIG. 2A depicts a business model 10 showing logical relationships between business processes (or subject area), computer application supporting the business processes, and tables utilized by the computer applications, in accordance with embodiments of the present invention. FIG. 2B depicts a physical database schema of the tables utilized by the computer applications, in accordance with embodiments of the present invention. There are 3 business processes, 5 computer applications and 9 tables in the business model 10 of FIGS. 2A and 2B. The 3 business processes are Business Process 1, Business Process 2, and Business Process 3. Business process 1 is supported by computer application 1, and computer application 1 utilizes Table C1.T1. Business process 2 is supported by computer application 2, and computer application 2 utilizes Table C2.T1. Business Process 1 is supported by computer applications 3, 4, and 5. Computer application 3 utilizes Tables C1.T2, C1.T3, and C1.T4. Computer application 4 utilizes Tables C2.T2, C2.T3, and C2.T4. Computer application 4 utilizes Table C2.T5.

In FIGS. 2A and 2B, the tables are represented in the form Cx.Ty and pertain to technical data tables in the data warehouse. FIG. 2B shows metadata associated with the technical data for each table, wherein the metadata exists in the system catalog of the data warehouse. The tables Cx.Ty follow a schema/creator-name.table-name nomenclature, and columns (i.e, attributes) are represented as attr_z. Note that all of this information and more (e.g. business definitions within the comments of tables and columns, cardinality of table, cardinality of columns, index detail) is inherently contained within the system catalog of the relational database management system (RDBMS). Cardinality of table pertains to the number of rows the table contains. Cardinality of columns pertains to the number of columns within tables. The symbol represented by reference numeral 12 denotes that the corresponding attribute is a primary key of the table. The text "FK" indicates that the associated attribute is a foreign key of the parent table. The business model example of FIG. 2 will be utilized in the discussion infra of various aspects of the present invention.

The symbol 13 (terminator of line between related tables) between tables in FIG. 2B denotes a one-to-many relationship with respect to rows of the related tables. For example, for each row in Table C1.T1 there are one or more corresponding rows in table C1.T2. To illustrate, if a column of Table C1.T1 is for contract number for a contract for the sale of parts, and if Table C1.T2 has both the contract number column and a part number column, then each contract for multiple parts necessitates said one-to-many relationship with respect to the rows of Tables C1.T1 and C1.T2.

The tables Cx.Ty relate to data tables in the data warehouse. FIG. 2B shows technical metadata associated with the data for each table, and the technical metadata exists in the system catalog of the data warehouse.

Figure 3:
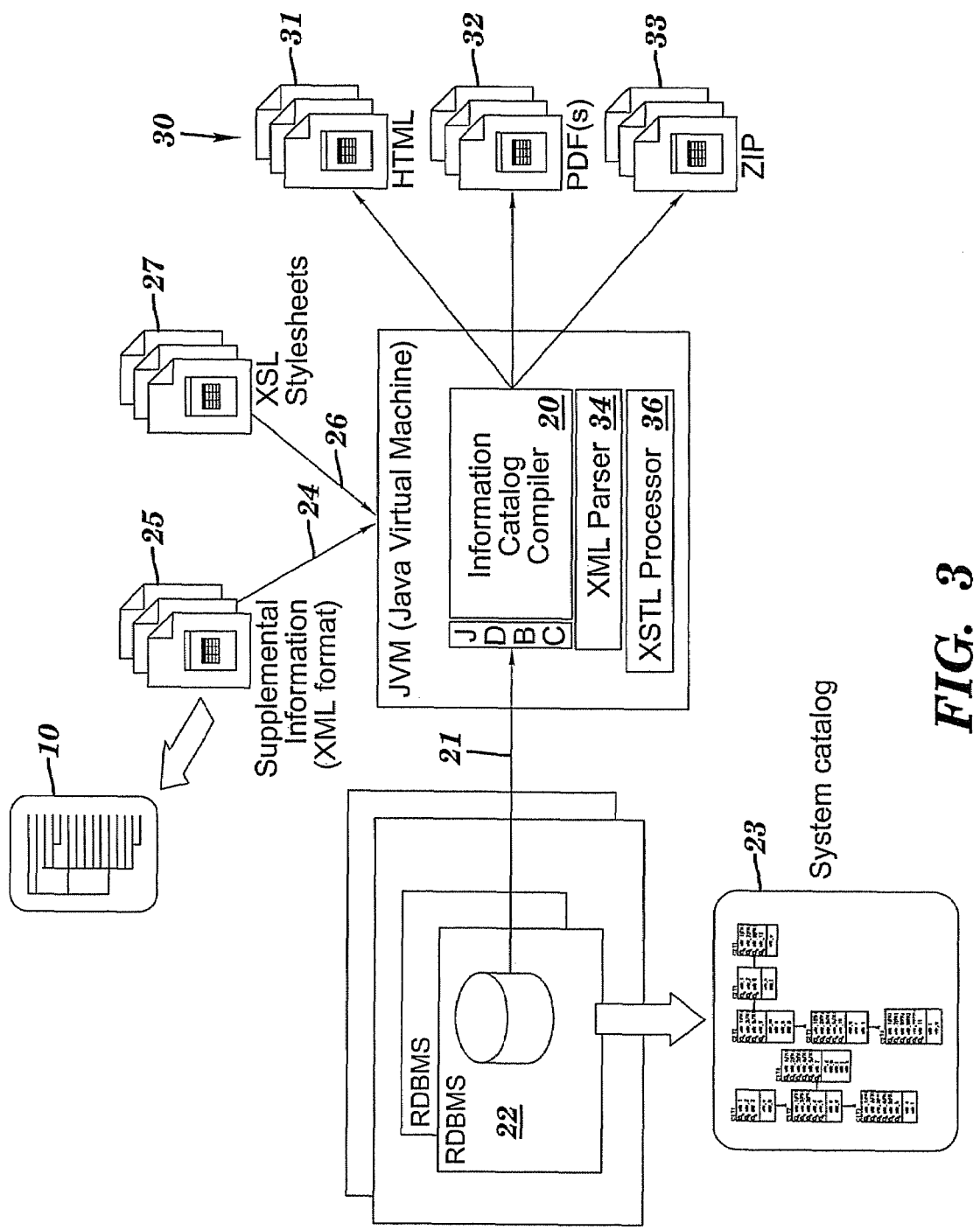
FIG. 3 depicts an overview of generation of an information catalog by an information catalog compiler, in accordance with embodiments of the present invention.

FIG. 3 depicts an overview of generation of an information catalog 30 by an information catalog compiler 20, in accordance with embodiments of the present invention. In FIG. 3, the information catalog compiler 20, which is the software that overseers and controls the entire process of generation the information catalog 30, receives three inputs, namely: technical metadata 21 from a data warehouse embodied in RDBMS 22, business metadata 24 from an eXtensible Markup Language (XML) file 25, and presentation metadata 26 from an eXtensible Stylesheet Language (XSL) file 27.

The source of the technical metadata 21 in the RDBMS 22 is the system catalog 23 of the RDBMS 22. The technical metadata 21 being accessed by the information catalog compiler 20 may be a XML stream in a XML format, as will be discussed infra in conjunction with FIG. 4.

The business metadata 24 in the XML file 25 is "supplemental information" and is configured to describe a business model such as the business model 10 of FIG. 2. The XML file 25 may have other supplemental information such as, inter alia, additional technical metadata to supplement the technical metadata in the system catalog 23 of the RDBMS 22.

The presentation metadata 26 in the XSL stylesheets of the XSL file 27 is configured to specify the presentation format of the technical metadata 21 and of the business metadata 24 in the information catalog 30. The separation and independence of the presentation metadata 26 from the content (i.e., technical metadata 21 and the business metadata 24) allows the content to be flexibly presented in any desired presentation format(s) in the information catalog 30.

The information catalog 30 comprises at least one result file drawn from an Hypertext Markup Language (HTML) file(s) 31, a PDF file(s) 32, and a ZIP file(s) 33, wherein the HTML, PDF, and ZIP formats are non-limiting examples of presentation formats that may be specified in the XSL stylesheets of the XSL file 27. A PDF file has a Portable Document Format file format that displays or prints as an electronic image as intended and is portable across computer platforms. A ZIP file is one or more files in a compressed form according to a particular format, called a ZIP format.

The XML parser 34 and the eXtensible Stylesheet Language Transformations (XSTL) processor 36 are each called by the information catalog compiler 20 as will be explained infra in conjunction with FIG. 4.

Figure 4:
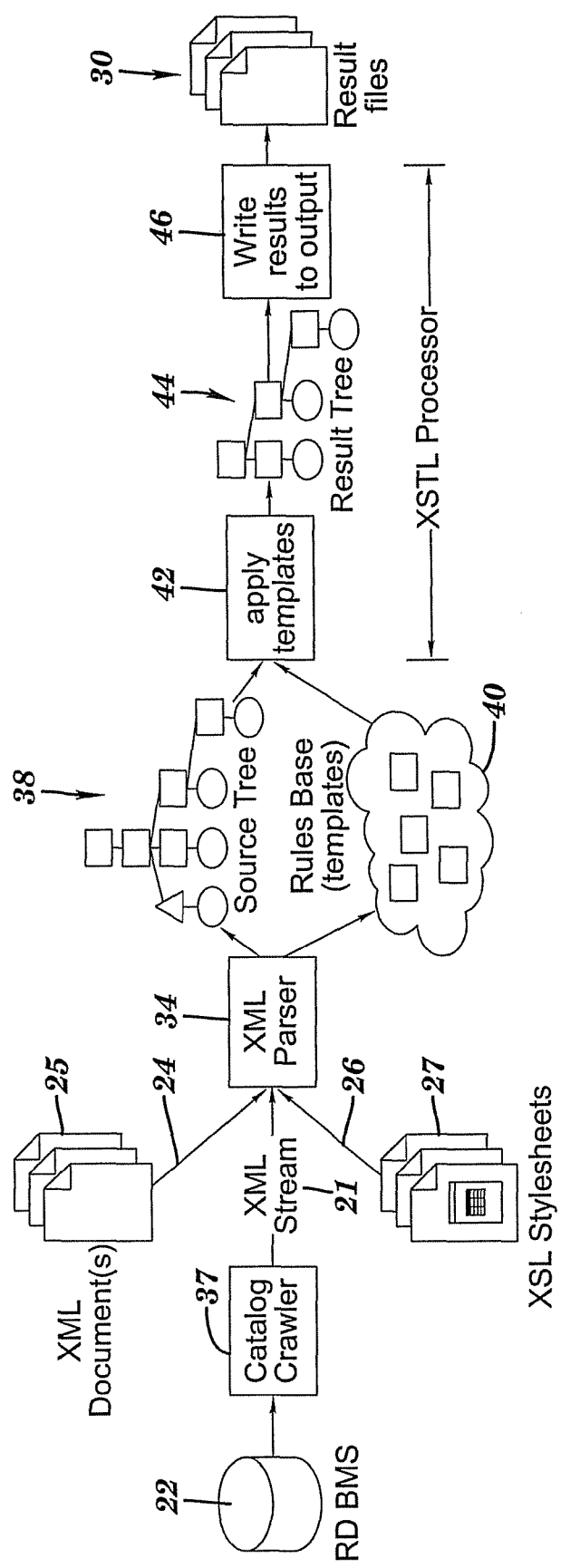
FIG. 4 depicts generation of the information catalog by the information catalog compiler, in greater detail than is shown in FIG. 3, in accordance with embodiments of the present invention.

FIG. 4 depicts generation of the information catalog 30 by the information catalog compiler 20, in greater detail than is shown in FIG. 3, in accordance with embodiments of the present invention. The information catalog compiler 20 (see FIG. 3) is a Java-based tool that automates the tedious process of compiling and publishing the information catalog 30. The compiler 20 performs a catalog crawler step 37 which "crawls" through the system catalog (see system catalog 23 of FIG. 3) of the RDBMS 22, using Java Database Connection (JDBC) drivers, and produces a XML stream 21 marked up using XML. JDBC is specific to the DB2® relational database system and would be replaced by analogous drivers if another relational database system (e.g., ORACLE®) were utilized. The information in XML stream 21 is then augmented with as much supplemental information in the XML document(s) 25 and XSL stylesheets 27 as is needed to produce a meaningful information catalog 30. The supplemental information can be in either text or HTML format and is wrapped in part or whole with a robust set of pre or user defined XML tags. Note that the solution relies on open-source XML parsers and thus any imbedded HTML must be "well formed" (e.g. end tags must be explicit, tags must be properly nested, attributes must be quoted).

The information catalog compiler 20 exclusively uses open-source tools. It relies on a key feature of XML of describing content and not presentation (like HTML or word processors). By applying different XSL stylesheets 27 to the same XML document 25, the XML document 25 can be rendered in different presentation formats. With the present information, the information is in the XML document 25, while the rendering instructions for prescribing presentation format are elsewhere (i.e., in the XSL stylesheets 27). In other words, content and presentation are separate.

The XML parser 34 parses the source information (i.e., technical metadata in the XML stream 21 and business metadata 24 in the XML document or file 25) and generates a source tree 38 from the parsed source information. The source tree 38 represents a structured form of the parsed source information stored in computer memory or storage, wherein the parsed technical metadata 21 and the parsed business metadata 24 are logically linked to each other in the source tree 38. The XML parser 34 also generates a rules base 40 of rules (i.e., "templates") derived from the presentation metadata 28 in the XSL stylesheets 27.

In step 42, the information catalog compiler 20 calls the XSTL processor 36 to apply the templates of the rules base 40 to the source tree 38 to generate a result tree 44. The XSTL processor 36 traverses the source tree 38 in a recursive descent algorithm, which start at the root node and goes through the source tree 38 until a leaf node is reached, and then comes back through the source tree 38 to the root node. By traversing the entire source tree 38, the XSTL processor 36 generates the result tree 44. The XSTL processor 36 determines whether there is a rule in the rules base 40 for each element in the source tree 38. If there is no rule for the element, then the element is written out as text. If there is more than one rule for the element, then the XSLT processor 36 applies one or more of such rules in accordance with a rule hierarchical scheme.

The information catalog compiler 20 uses XML with the XSLT processor to render the information catalog 30 into the various formats. The eXtensible Stylesheet Language (XSL) is used to drive the XSLT processor. XSL is a style sheet language for documents marked up using XML and is used to describe, utilizing the XSL formatting vocabulary, how an XML source document is transformed into another document (e.g. HTML, PDF, ZIP files). The result tree 44 is a precursor to the information catalog 30 and is stored in computer memory or storage.

Details relating to various aspects of FIG. 4 will next be discussed.

XML Processing

FIG. 5 depicts a sample XML document or file showing a root element 'info-catalog' and its attributes, in accordance with embodiments of the present invention. For example, the attribute 'rootname' has the value "ICCExample". Generally, the components of a XML document comprise: tags, elements, and attributes. A tag is the text between the left angle bracket (<) and the right angle bracket (>). There are starting tags (such as <info-catalog>) and ending tags (such as </info-catalog >). An element is the starting tag, the ending tag, and everything in between. An attribute is a name-value pair inside the starting tag of an element. In the example, of FIG.

5, 'rootname' is an attribute of the <info-catalog> element. Any embodiment of the invention may choose to use different attributes and or input flags. An existing embodiment of the invention has 36 distinct attributes for the <info-catalog> XML element. The 36 attributes are used to control what gets produced, look and feel characteristics, and common headers and footers. The bolded attributes in FIG. 5 (e.g., 'rootname') can be changed from a default value, whereas the unbolded attributes (e.g. 'xmlns:xsi') cannot be changed.

The attribute 'rootname' specifies the directory to write the rendered output to.

The attribute 'documenttitle' specifies the title to be placed near the top of the overview summary file. The XSL Stylesheet decides the placement of the title. Currently the title is placed as a centered, level-one heading directly beneath the upper navigation bar. The title may contain HTML tags and white space, though if it does, it must be entered as a unique XML element or entered through the command line, enclosed in quotes (quotes are optional if supplied in the initialization file). Any internal quotation marks within title will have to be escaped (e.g. \").

The attribute 'header' denotes header text to be used at the top of each document. This is intended for information such as the version number or generation date.

The attribute 'contact' denotes an Email contact address. By including this attribute, the XSL Stylesheets will generate a contact link at the bottom of each HTML detail page. If this attribute is omitted, then the contact link will not be generated.

The attribute 'columnXRef' denotes that for each column output as part of each table detail page, a cross reference can be generated to show and link every place where this column name is used within the data warehouse. Similar to the 'contact' attribute, omitting the 'columnXRef' attribute will produce output that does not cross reference at the column level.

The attribute 'sortByColumnName' allows a user to specify that columns within tables should be sorted alphabetically instead of as they appear within the physical table structure.

All <info-catalog> XML element attributes can alternatively be specified in the command line or within a process initialization file. This is a convenience function to allow overriding values for specific runs without having to edit the XML. The order of precedence is: 1) command line; 2) initialization file; and 3)<info-catalog> XML element attribute.

Along with <info-catalog> XML element attributes, there are a few XML elements that are also defined and illustrated in the XML document or file of FIG. 6, in accordance with embodiments of the present invention. The defined elements in FIG. 6 include: <creators>, , <description>, <footer>, and <bottom>. These are examples of elements that control the content (e.g. the <creator> element limits the tables that will be included based on the table's creator name) and "look & feel" of the resulting Information Catalog (e.g. the <footer> element causes a standard footer be placed at the bottom of all generated output pages).

The <creators> element specifies the list of table creators that the information catalog should be generated for. If the <creators> element is omitted, then the compiler pulls all tables within the DB2® subsystem with the exception of the system catalog tables themselves. If the <creators> element is entered through the command line, then this list should be comma separated and enclosed in double quotes.

The element is a brief abstract describing the data warehouse layer the information catalog was generated for. The XSL Stylesheet decides the placement of the text of the abstract. Currently the abstract is placed under the title on the overview summary page of the detail frame (see infra FIG. 13 and description thereof). In the example described herein, the element was omitted; thus the information catalog compiler generated a default abstract based on the document title.

The <description> element may contain a description of the data warehouse's overall functionality. Any standard, well-formed HTML may be contained within the <description> element, including lists, tables, images, links, or multimedia objects.

The <footer> element specifies the footer text to be placed at the bottom of each output file. The XSL stylesheet decides the placement of the footer text. The footer text may be placed under the lower navigation bar. The footer may include HTML tags and white space. If entered through the command line, the footer must be enclosed in quotes. However, quotes are optional if supplied in the initialization file. Any internal quotation marks within the footer will have to be escaped (e.g. \").

The <bottom> element denotes optional text to follow the footer. The <bottom> element, used in conjunction with the XSL Stylesheets, allows flexibility ending pages of the information catalog. This flexibility is useful for disclaimers, company logos, copyright information, etc. Business process and application XML elements may exists in the same XML document as the root or one or more distinct XML documents. This helps enable organizations, which may already have business processes and application descriptions documented in HTML ("well-formed" HTML tags will validly parse through an XML parser) or other electronically readable format, reuse existing content.

Note that if multiple XML documents are used, each must be contained in a single element. That single element is called the root element of the document, and it contains all the text and any other elements in the document. For each of the subsequent documents, the name of the root element is unimportant. The root element 'info-catalog' was illustrated supra in conjunction with FIG. 5.

The XML specification requires a parser to reject any XML document that doesn't follow the basic rules. Most HTML parsers will accept sloppy markup, marking a guess as to what the author of the document intended. To avoid ambiguity, the creators of XML decided to enforce document structure from the beginning. Therefore, HTML embedded within XML elements used by the information catalog compiler must follow XML "well-formed" rules, including: 1) XML elements cannot overlap; 2) end tags are required; 3) XML elements are case sensitive; and 4) attributes must have quoted values. These well-formed rules will one next explained.

A first well-formed rule is that XML elements cannot overlap. For example, the following XML code Table 1 is invalid.

TABLE 1

```
<p>
    <b>XML is a <i>really</b> useful technology </i>
</p>
```

That is, if a <j> element begins inside a <b> element, then the <j> element must end inside the <b> element. In contrast, the following XML code in Table 2 is valid.

TABLE 2

```
<p>
    <b>XML is a <i>really</j> useful
```

TABLE 2-continued

```
              technology.</b>
           </p>
```

An XML parser will accept only the preceding markup; the HTML parsers in Web browsers will accept both.

A second well-formed rule is that end tags are required. For example, the following XML code in Table 3 is invalid.

TABLE 3

```
<p>my first paragraph...
<p>my second paragraph...
```

The markup is not legal because there are no end paragraph (</p>) tags. While this is acceptable in HTML (and, in some cases, SGML), an XML parser will reject it. If an element contains no markup at all it is called an empty element; the HTML break (<br>) and image (<img>) elements are two examples. In empty elements in XML documents, you can put the closing slash in the start tag. The two break elements and the two image elements below mean the same thing to an XML parser. In contrast, the following XML code in Table 4 is valid:

TABLE 4

```
p>my first paragraph...</p>
<p>my second paragraph...</p>
<br/>
<br></br>
<img src="../img/c.gif"/>
<img src="../img/c.gif"></img>
```

A third well-formed rule is that XML elements are case sensitive. In HTML, <h1> and <H1> are the same; in XML, they are not. If one attempts to end an <h1> element with a </H1> tag, the XML parser will return an error.

A fourth well-formed rule is that attributes must have quoted values. There are two rules for attributes in XML documents, namely: 1) attributes must have values; and 2) the attribute values must be enclosed within quotation marks. Comparing the invalid and valid code in the examples below, the markup at the top is legal in HTML, but not in XML. To do the equivalent in XML, the attribute is given a value and the value is enclosed in quotes. The invalid XML code in Table 5 is:

TABLE 5

```
<!-- NOT legal XML markup -->
<ol compact>
```

The valid XML code in Table 6 is:

TABLE 6

```
<!-- legal XML markup -->
<ol compact="yes">
```

Either single or double quotes may be used, so long as said use of single or double quotes is consistent. If the value of the attribute contains a single or double quote, then the other kind of quote may surround the value (as in name="Doug's car"), or one may use the entities """ for a double quote and "'" for a single quote.

An entity is a symbol (e.g., """) that the XML parser replaces with other text, such as replacing "quot;" with """. The XML specification defines five standard entities that can be used in place of various special characters. These five standard entities are: < (for the less-than sign); > (for the greater-than sign); " (for a double-quote); &apos (for a single quote or apostrophe); and & (for an ampersand.).

Along with the aforementioned five standard entities, the information catalog compiler has defined a number of additional entities. Anywhere the XML processor finds one of these additional entities, the information catalog compiler replaces the additional entity with defined text. The additional entities include: &title; &version; &sysdate; and &systime.

The &title; entity inserts, in-line, the information catalog's title as passed to the compiler through the XML or command line.

The &version; entity inserts, in-line, the information catalog's version/release number as passed to the compiler through the XML or command line. The text has no special internal structure.

The &sysdate; entity inserts, in-line, the system date when the compiler was run. The date is in the format identified by the locale that runs the compiler.

The &systime; entity inserts, in-line, the system date and time when the compiler was run. The date and time is in the format identified by the locale that runs the compiler.

FIG. 7 depicts XML code that describes the business model discussed supra in conjunction with FIG. 2, namely Business Process 3 and associated computer applications 3-5, in accordance with embodiments of the present invention. The XML document illustrated by FIG. 7 can contain multiple <subject-area> elements and each subject area can contain multiple <application>s.

FIG. 7 illustrates two alternative mechanisms for associating tables of the data warehouse with computer applications. A first mechanism is via the <label> element, which tells the information catalog compiler that the table to application relationship exists within the <label> attribute in the system catalog; i.e., the system catalog recognizes <label>. The <label> element in FIG. 7 links to all tables known by the system catalog to have a label of APP-1. A second mechanism is that tables can be associated with an application using the <tablelist> element, which specifies explicit table names of tables in the data warehouse. For example, the <tablelist> element in FIG. 7 establishes an application called "Operational Application 4" associated with three tables named T2, T3, and T4, each table having <creator>C2.

The XML code in FIG. 7 comprises the following nodal structure. The element "subject area" has value of "Business Process/SubjectArea". The "subject area" element has a child node, called "application". The "application" node has 4 nodes: name (has value "Operational Application 1"), abbr (has value "APPL-1"), label (has value "APPL-1"), and desc (has no value). The node "desc" has a paragraph (<p>) child node under it.

The nodal structure of the XML code of the XML file(s) 25 is transformed by the XML parser 34 into the source tree 38 (see FIG. 4, described infra). The information catalog compiler 20 calls the XML parser 34, and the XML parser 34 builds the source tree 38 in the computer's logical memory.

XSL Processing

Once the technical metadata and business metadata is collected as described supra, XSL (eXtensible Style Language) is used to render the collected technical metadata and business metadata into multiple formats. XSL itself is a transformation language and a formatting language used to automate the conversion of one XML document into another XML document. The transformation language provides elements that define rules for transforming the source XML document. The formatting language provides elements that define formatting objects used to build the target XML document.

XSTL is designed for use as part of XSL, which is a stylesheet language for XML. In addition to XSTL, XSL includes an XML vocabulary for specifying formatting. XSL specifies the styling of an XML document by using XSTL to describe how the document is transformed into another XML document that uses the formatting vocabulary.

XSTL Stylesheets are XML documents. The XSTL namespace has the URI http://www.w3.org/1999/XSL/Transform and is used to identify semantically significant elements.

The XSTL Stylesheets used by the invention render the information by having a master stylesheet, InfoCatalog.xsl, "call" other stylesheets to render the particular artifact.

The icc-styles.xsl stylesheet contains common styles such as the common navigator bar, table layouts, header and footer styles, etc.

The icc-variables.xsl stylesheet contains variables used by the different stylesheets. These variables can be used to set company or organization names, copyright text, etc.

The xml-fo-trans.xsl stylesheet describes a set of transformations that convert HTML tags to their corresponding Format Object tags to be rendered into PDF documents.

The xslt-utilities stylesheet XSLT utilize convenience utilities to perform functions such as substring. Other convenience functions are likewise delivered in Java classes. These function include copying files, getting the platform specific file separator, and retrieving formatted dates.

Examples of the transformations of the html-xml-trans.xsl stylesheet are shown infra. Consider an HTML tag that does not contain attributes, such as the paragraph (<p>) tag. The transformation may be as simple as the lines of code in Table 8.

TABLE 8

```
<!--
*************************************************************
template to process p (paragraph) element
*************************************************************-->
<xsl:template match="p">
<p> <xsl:apply-templates select="*|text( )"/> </p>
</xsl:template>
```

Applying the root element, <info-catalog>, with different "modes" performs the "call". For example, to build table summary pages for each table within the data warehouse layer the following XSL is specified in the InfoCatalog.xsl file: <xsl:apply-template select="info-catalog" mode="build-table-summary"/>. By convention, the template that matches this mode is contained within the XSL file build-table-summary.xsl. To illustrate how the output is rendered, the FIG. 8 depicts sample XSL code from the first few significant lines of the build-table-summary.xsl file, in accordance with embodiments of the present invention. FIGS. 9A and 9B (collectively, "FIG. 9") provide explanations of numbered lines 1-19 of FIG. 8, in accordance with embodiments of the present invention.

The master stylesheet, InfoCatalog.xsl, includes other XSLT stylesheets using the xsl:include element. The following two xsl:include elements in Table 7 have an href attribute whose value is a URI reference identifying the stylesheet to be included.

TABLE 7

```
<xsl:include href="icc-variables.xsl"/>
<xsl:include href="build-overview-summary.xsl"/>
```

Figure 10:
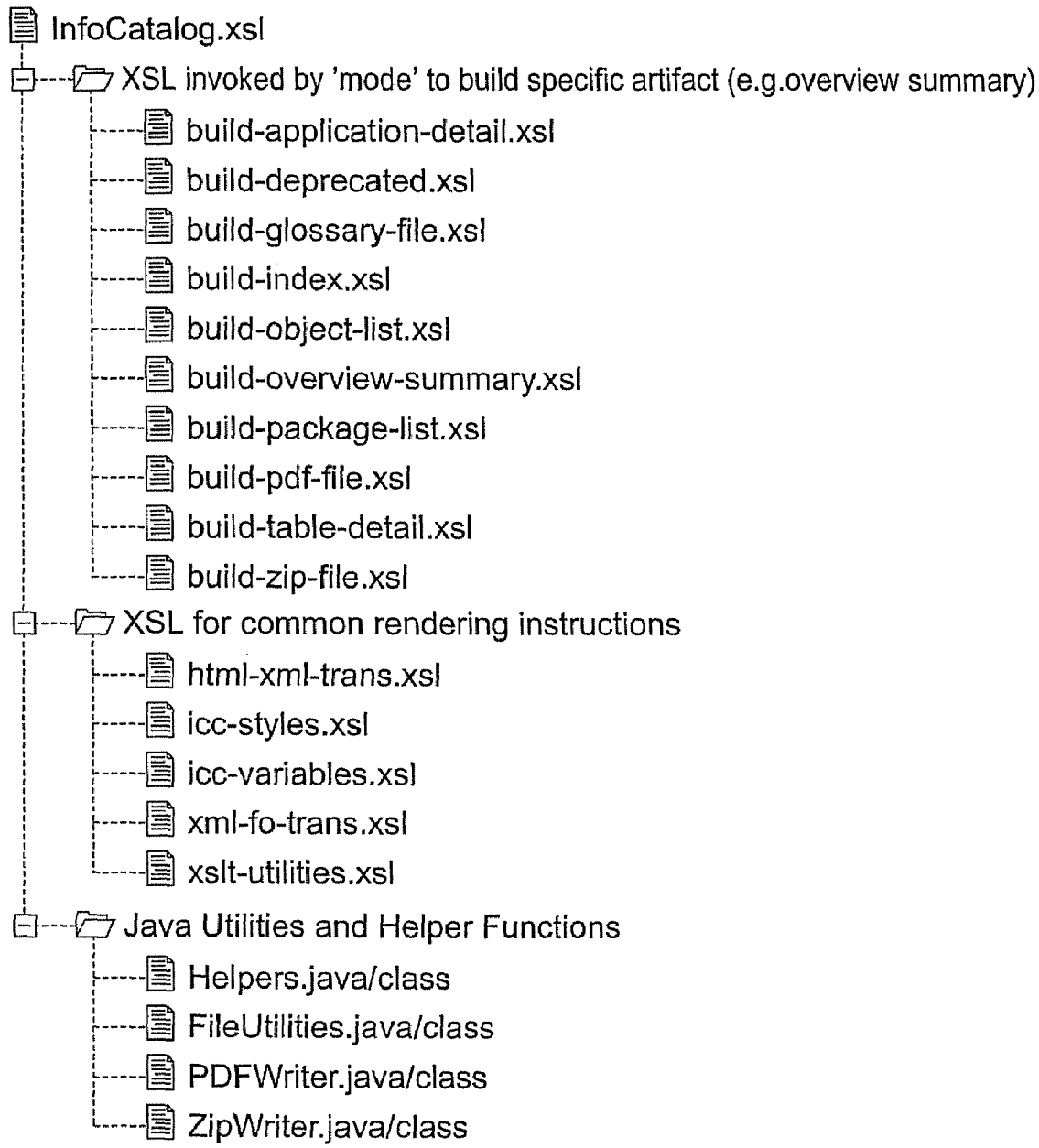
FIG. 10 depicts a structured list of XSL stylesheets used for specifying a presentation format for the information catalog, in accordance with embodiments of the present invention.

A structured list of XSL stylesheets for the example described herein are shown in FIG. 10, in accordance with embodiments of the present invention. Whereas some XSL stylesheets listed in FIG. 10 exist to render specific artifacts, such as the overview summary HTML page, other stylesheets are generic rendering instructions that are and can be used by all XSL Stylesheets, namely the stylesheets of html-xml-trans.xsl, icc-styles.xsl, icc-variables.xsl, xml-fo-trans.xsl, and xslt-utilities.

The html-xml-trans.xsl stylesheet describes a set of transformations that writes out HTML tags embedded within XML elements.

When an XML element, including the root element, contains a <p> element, the above template is matched which: 1) renders the opening <p> tag; 2) applies template for ALL (*) XML elements or text that are embedded in the <p> element; and renders the closing </p> tag. FIG. 11 depicts a transformation template relating to an HTML tag containing attributes, such as the table (<table>) tag. When an XML element, including the root element, contains a <table> element, the transformation template in FIG. 11 is matched which:

1) renders the opening <table> tag;
2) sets up a loop to process each attribute of the <table> element (line 3: <xsl:for-each select="@*">, XSL shorthand for an attribute is the @ sign);
3) for each attribute the xsl:attribute element is used to add the attribute to the result elements;
4) sets up a loop to process each <table-row> or <tr> element (line 8);
5) renders the opening <tr> tag (line 9);
6) sets up a loop to process each attribute of the <table-row> or <tr> element (line 10-14);
7) sets up a loop to process each <table-cell> or <td> element (line 16);
8) renders the opening <td> tag (line 17);
9) sets up a loop to process each attribute of the <table-cell> or <td> element (line 18-22);
10) applies template for ALL (*) XML elements or text that are embedded in the <table-cell> or <td> element (line 24);
11) renders all end tags and closes all xsl:for-each tags; and
12) closes the xsl:template tag.

Information Catalog Output

Figure 12:
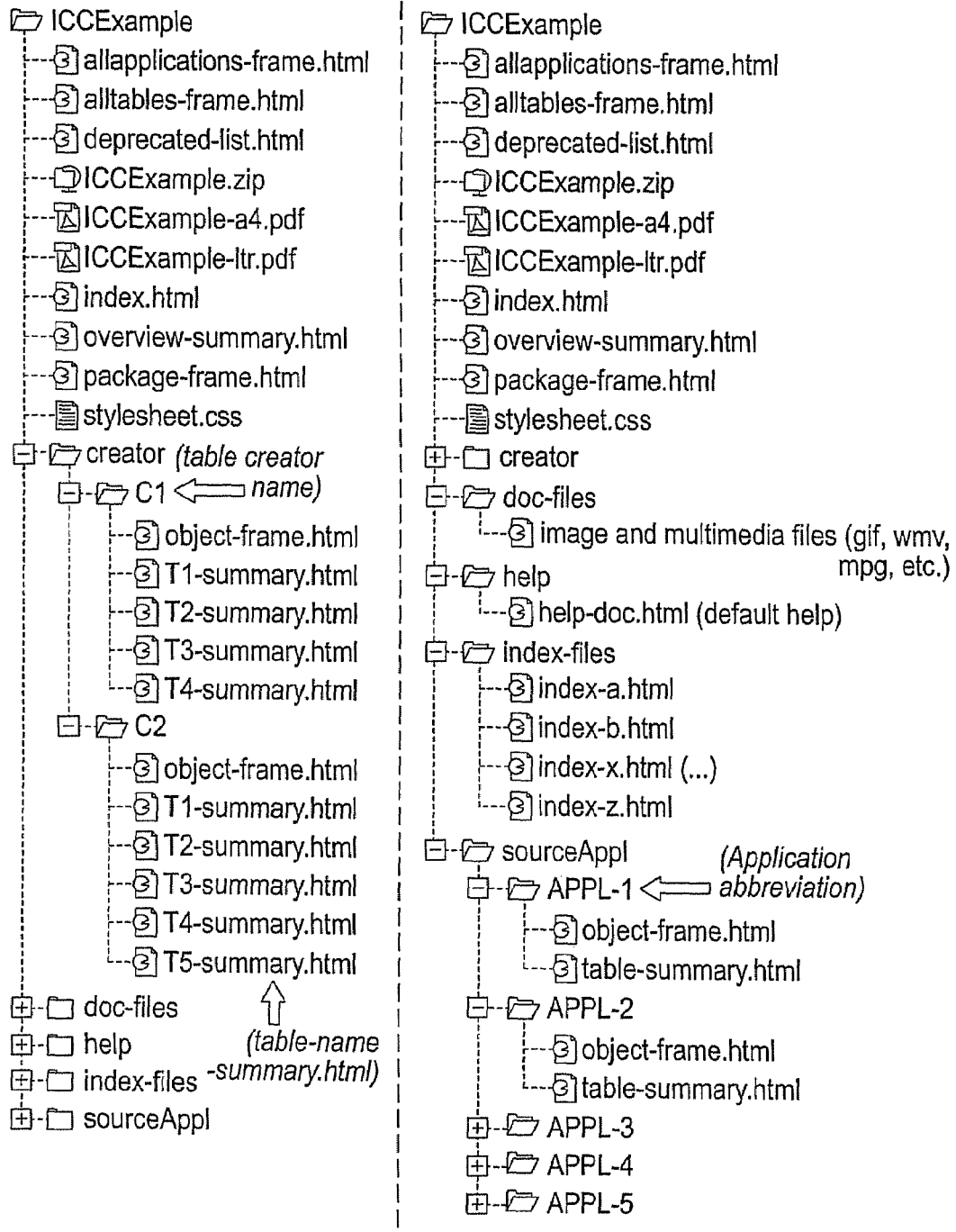
FIG. 12 depicts a structured list of result files of the information catalog associated with the business model of FIG. 2A and database model of FIG. 2B, in accordance with embodiments of the present invention.

The information catalog 30 of FIG. 4 is a set of result files. FIG. 12 depicts a structured list of result files of the information catalog associated with the business model 10 of FIG. 2A and database model of FIG. 2B, in accordance with embodiments of the present invention. The result files of FIG. 12 are structured in accordance with the 5 computer applications (APPL-1, APPL-2, APPL-3, APPL-4, APPL-5) and 10 associated tables (C1.T1, C1.T2, C1.T3, C1.T4, C2.T1, C2.T2, C2.T3, C2.T4, C2.T5) of the business model 10.

The XSL stylesheets listed in FIG. 10 are used to generate the results files of the information catalog in FIG. 12. For example, the "build-overview-summary.xsl" stylesheet in FIG. 10 is used to generate the "overview-summary.html" result file in FIG. 12. As another example, the "build-package-list.xsl" stylesheet in FIG. 10 is used to generate the "package-frame.html" result file in FIG. 12.

The end user enjoys the benefit of a graphical interface, which may be interactively navigated to display characteristics of the business model of interest, such as the business model 10 of FIG. 2. Such interactive navigation by the end user involves execution of the result files of the information catalog as will be next explained.

The graphical interface navigated by the end user is an integrated group of frames in accordance with the following schematic representation.

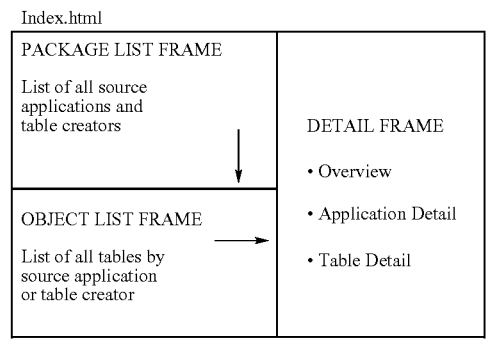

As the illustration above shows, there are three primary frames: package list frame, an object list frame, and a detail frame.

The package list frame is used to update the object list frame with tables or computer applications. Thus the package list frame drives the object list frame as indicated by the down arrow pointing from the package list frame to the object list frame.

The object list frame is used to update the detail frame with a table or application, depending on whether tables or applications are selected by the end user in the package list frame. Thus the object list frame drives the detail frame as indicated by the right arrow pointing from the object list frame to the detail frame.

The detail frame contains the detailed pages associated with the selected table, the selected application, or other detailed information. The alternative detailed displayable information in the detail frame includes content as shown in Table 9.

TABLE 9

1) An overview summary page, which is the default page for the detail frame of the information catalog. The overview summary page can also always be displayed by selecting overview from any navigation bar.
2) Application summary pages, which contain source application specific detail.
3) Table summary pages, which contain table specific details.
4) A Deprecated Table page that lists tables within the data warehouse that are not recommended for use, due to improvements, and a replacement table is usually given. Deprecated tables may be removed in future implementations of the data warehouse layer. The Deprecated Table TABLE 9-continued page can be displayed by selecting Deprecated from any detail page's navigation bar.
5) An Index page which contains an alphabetic list of all tables, columns, indices, 7 etc. This page can be displayed by selecting Index from any navigation bar.
6) A Help page which displayable by selecting Help from any navigation bar.

1) An overview summary page, which is the default page for the detail frame of the information catalog. The overview summary page can also always be displayed by selecting overview from any navigation bar.

2) Application summary pages which contain source application specific detail.

3) Table summary pages, which contain table specific details.

4) A Deprecated Table page that lists tables within the data warehouse that are not recommended for use, due to improvements, and a replacement table is usually given. Deprecated tables may be removed in future implementations of the data warehouse layer. The Deprecated Table page can be displayed by selecting Deprecated from any detail page's navigation bar.

5) An Index page which contains an alphabetic list of all tables, columns, indices, etc. This page can be displayed by selecting Index from any navigation bar.

6) A Help page which can be displayed by selecting Help from any navigation bar.

FIG. 13 depicts a graphical interface showing the generated information catalog representation that would first appear to an end user for the business model 10 of FIG. 2, in accordance with embodiments of the present invention. The information catalog representation of FIG. 13 depicts the package list frame 51, the object list frame 52, and the detail frame 53. Note that FIG. 13 does not literally show the information catalog, but rather a representation thereof. The actual information catalog is the set of result files listed in FIG. 12. The representation of FIG. 13 is generated by executing the result files of FIG. 12. For example, execution of the overview-summary.html file of FIG. 12 results in the overview summary view in the detail frame 53 of FIG. 13.

Figure 14:
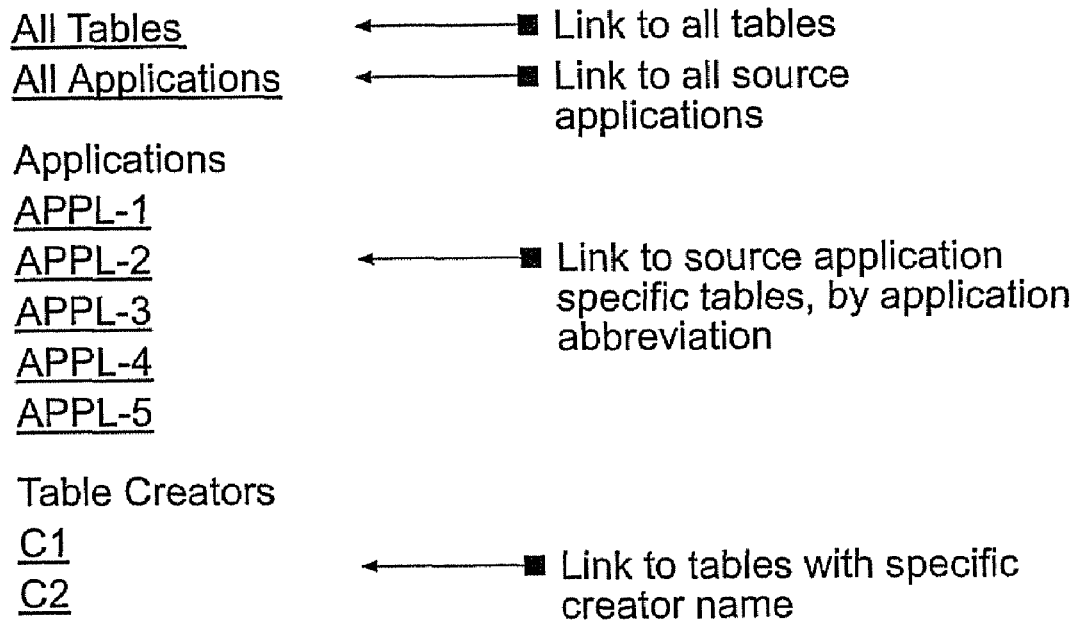
FIG. 14 describes the package list frame for the business model of FIG. 2A and database model of FIG. 2B, in accordance with embodiments of the present invention.

In FIG. 13, the package list frame 51 is used to update the object list frame 52 with tables or computer applications. The end user selects either tables or applications. For selection of tables, the tables include: all tables within the data warehouse layer that the information catalog has been generated for, only tables populated from a specific source application, only tables with a specific creator name, or all source applications that feed the data warehouse layer. The package list frame itself contains: catalog title, link to all tables, link to all source applications, link to source application specific tables, by application abbreviation, link to tables with specific creator name. FIG. 14 describes the package list frame 51 for the business model 10 of FIG. 2, in accordance with embodiments of the present invention.

In FIG. 13, the object list frame 52 is used to list all source application that feed the data warehouse layer, all tables names within data warehouse layer, all data warehouse layer tables that are fed from a specific computer application, or all data warehouse layer tables with a specific table creator name. Selections within the object list frame 52 are used to update the detail frame with the selected table or application detail page. Note that information will not wrap in this frame; instead, horizontal scroll bars are used. FIG. 15 describes the object list frame 52 for the business model 10 of FIG. 2A and database model of FIG. 2B, in accordance with embodiments of the present invention.

In FIG. 13, the detail frame 53 contains the detailed pages associated with the selected table, the selected application, or other detailed information. Before looking at each one of the detail frame pages, the top and bottom navigation bars will be examined. These are common for all detail pages, only varying by enabled options or semantically based on the type of detailed page being displayed.

Figure 16:
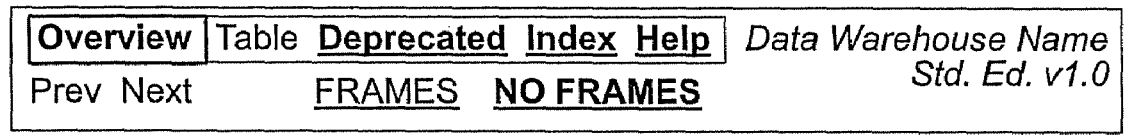
FIG. 16 shows a navigation bar, in accordance with embodiments of the present invention.

FIG. 16 shows a navigation bar, in accordance with embodiments of the present invention. As with all rendered output, the "look and feel" of the navigator bar can be changed to meet individual needs and/or organizational design standards by changes to either the HTML Cascading Stylesheet(s) and/or the XSL Stylesheets used to render the HTML.

Attributes of XML element <info-catalog>, or command line input, can used to include or exclude either the navigation bar or components of the bar (e.g. Deprecations, index, help). Components of the navigation bar include: Tables (or Applications), Deprecated, Index, Help, Prev/Next (table or application or index letter), and Frames/No Frames.

The Overview page selectable from the navigation bar is the front page of this information Catalog document and provides a list of all source applications that feed the data warehouse layer that the information catalog was generated for, with a summary for each. The end user can subsequently drill into each application to get additional information and a listing of the tables that are associated with each application.

The Tables (or Applications) page selectable from the navigation bar includes two distinct types of documents, namely Application Summary documents and Tables Summary documents. In the Application Summary document, each source application has a page that contains descriptive information on the application and a list of table it feeds the data warehouse layer. In the Table Summary document, each table has a page that contains a list of its table attributes, column descriptions, column schema, indices, relationships, and notes on query construction using this table.

The Deprecated Table page lists all of the Data Warehouse Layer's tables that have been deprecated. A deprecated table is not recommended for use, generally due to improvements, and a replacement table is usually given. Deprecated tables may be removed in future implementations of the data warehouse layer.

The Index page(s) contains an alphabetic list of all tables, columns, indices, etc.

The Help page(s) contain help for the generated information catalog. The compiler will generate a default help page; however, help can be overridden or omitted.

The Prev/Next (table or application or index letter) links transition the end user to the next or previous table or application summary page or index page.

The Frame/No Frame links show and hide the HTML frames. All pages are available with or without frames.

Figure 17:
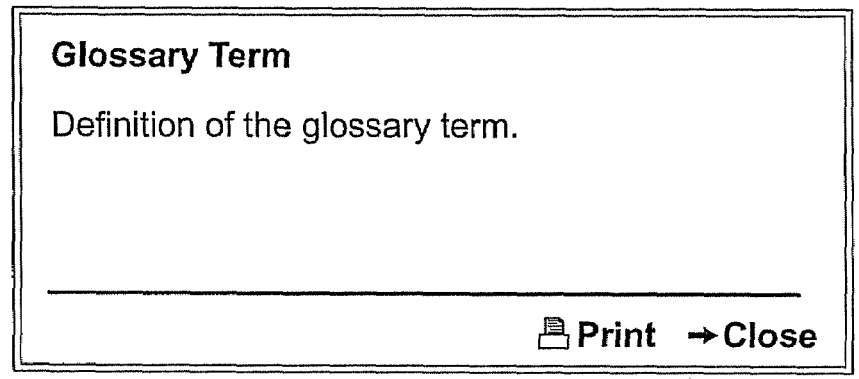
FIG. 17 shows the form of a glossary term, in accordance with embodiments of the present invention.

A pop-up glossary is common for all detail pages. Within detail pages, an attribute column name may be followed with a superscript question mark (?). This indicates that a definition for this attribute exists and can be displayed in a pop-up HTML window by selecting the question mark. The Glossary definitions are stored in the "glossary" sub directory under the root directory and display the information in a window that looks at the picture below. As with all rendered output, the "look and feel" of the popup glossary definitions can be changed to meet individual needs and/or organizational design standards by changes to either the HTML Cascading Stylesheet(s) and/or the XSL Stylesheets used to render the HTML. FIG. 17 shows the form of a glossary term, in accordance with embodiments of the present invention.

The default page for the generated information catalog detail frame is the Overview Summary page, which contains: 1) a title; 2) a description of the data warehouse layer overall function for the data warehouse layer that the information catalog was generated for; 3) Source Application Hierarchy; and 4) Repeating table for each functional area, containing: (a) the source application's abbreviation, (b) the source application's name, and a detailed business description of the functionality provided by the source application. FIG. 18 depicts links contained in the overview summary page, in accordance with embodiments of the present invention.

The "look and feel" of the Overview Summary can be changed to meet individual needs and/or organizational design standards by changes to either the HTML Cascading Stylesheet(s) and/or the XSL Stylesheets used to render the HTML. FIG. 19 depicts the Overview Summary for the business model 10 of FIG. 2A and database model of FIG. 2B, in accordance with embodiments of the present invention.

For each source application that feeds the data warehouse layer that the information catalog was generated for, an Application Detail page will be generated. The Application Detail page includes information as shown in Table 10.

TABLE 10

1. The business process/functional area the source application support.
2. The Application abbreviation and name.
3. Application attributes, including:
    (1) Update frequency for the data from the source application into the data warehouse layer.
    (2) Transformation rule applied to data from the source application into the Data Warehouse Layer.
    (3) Extract method used to pull the data from the source application.
    (4) Population method used to populate the data warehouse layer.
4. A detailed business description of functionality provided by source application.
5. A table listing each table in the data warehouse layer populated from the source application. This table contains:
    (1) The table's creator and table name.
    (2) A detailed business description of the content and purpose of the table within the source application and/or data warehouse layer.

FIG. 20 depicts links contained in the application summary page, in accordance with embodiments of the present invention.

The "look and feel" of the Application Summary can be changed to meet individual needs and/or organizational design standards by changes to either the HTML Cascading Stylesheet(s) and/or the XSL Stylesheets used to render the HTML. FIG. 21 depicts an Application Summary frame, in accordance with embodiments of the present invention.

For each table contained in the data warehouse layer that the information catalog was generated for, a Table Detail page will be generated. The Table Detail page includes content as shown in Table 11.

TABLE 11

1. The Table Name
2. Business description of the table
3. Table attributes
    (1) Cardinality (number of rows)
    (2) Number of columns
    (3) Number of key columns
    (4) Number of pages
    (5) Percent of pages
    (6) Number of parent relationships table participates in.

TABLE 11-continued (7) Number of children tables
    (8) Database name
    (9) Tablespace name
    (10) Created time-stamp
    (11) Last altered time-stamp
    (12) Time-stamp when statistics were last run for the table.
4. Links to each section of the page
5. Column List with business description of each column and a cross reference to other data warehouse tables where the column is also used.
6. Column schema
7. Indices
8. Relationships
9. Notes The top of every Table Summary page contains the name of the table, in the format of "Table-Creator.Table-Name". Following the table name is the business description of the table. This description begins with what is in the DB2® system catalog followed by any additional information that may have been provided by the user that generated the Information Catalog. If the table has been deprecated, this will also be noted along with the name and link to any replacement table(s). A deprecated table is identified within a <deprecated-list> XML element.

Table attributes are collected based on statistics gathered by the DB2® system related to the table itself. FIG. 22 depicts the format for table attributes, in accordance with embodiments of the present invention. The table attributes also include the information shown in Table 23, in accordance with embodiments of the present invention. Following the table attributes section are a series of links to the different areas of the Table Detail page.

Following the links section, a table is displayed with each column contained in the table along with the business description of the column. By default the columns are displayed in the physical order they appear in the table. By setting the sortByColum-nName attribute to "yes" in the info-catalog XML element or the input parameter (-sortByColumnName) the columns will be displayed in alphabetical order.

Additionally, cross-reference information can be included. This cross-reference is a list of all tables within the data warehouse layer that contains a column with the same name. Each cross-reference table is linked to the Table Detail page for the particular table. By default this cross-reference information is included; however it can be omitted setting the columnXRef attribute of the info-catalog XML element to "no" or specifying the input parameter, -nocolumnXRef. FIG. 24 contains a Column Summary, in accordance with embodiments of the present invention.

The next section contains the table column schema information. Like the column list section, this section, by default, displays the columns in the physical order they appear in the table. By setting the sortByColumnName attribute to "yes" in the info-catalog XML element or the input parameter (-sortByColumnName) the columns will be displayed in alphabetical order. FIG. 25 depicts the format of column schema and FIG. 26 depicts column schema, in accordance with embodiments of the present invention.

FIG. 27 depicts table index information and FIGS. 28A-28B depict indices attributes, in accordance with embodiments of the present invention.

The relationship section contains information pertaining to how a table inter relates with other tables within the data warehouse layer. Relationships provide users of the information catalog vital insight on how to write join operations. These relationships may be explicit, defined in the DB2® system catalog, or implicit, provided to the information catalog compiler at run time, using XML elements. FIG. 29 depicts relationship format and FIG. 30 depicts relationship attributes, in accordance with embodiments of the present invention.

The notes section contains any processing notes or points of interest entered as XML elements in regards to the specific table.

The deprecated table page provides a list of all tables that are deprecated, the business description for each table, and a cross-referenced of all tables within the data warehouse layer that should be used instead of the deprecated table. Each cross-reference table is linked to the Table Detail page for the particular table. A deprecated table is not recommended for use, generally due to improvements, and a replacement table is usually given. Deprecated tables may be removed in future implementations of the Data Warehouse layer. This page can be displayed by selecting Deprecated from any detail page's navigation bar. FIG. 31 illustrates deprecated tables, in accordance with embodiments of the present invention.

An Index page contains an alphabetic list of all source applications, tables, columns, and indices. All index information can be contained in a single page, split to multiple pages based on letter, or omitted, based on options used when the compiler is invoked. Setting the splitindex attribute of the info-catalog XML element to "yes" or specifying the "-splitindex" input parameter splits the index file into multiple files, alphabetically, one file per letter, plus a file for any index entries that start with non-alphabetical characters. Note that if the entire index is placed in a single file a navigation tag of TOP is added next to each letter's title to take the user back to the top of the index page. The index attribute of the info-catalog XML set to "no" or the "-noindex" input parameter omits the INDEX link in the navigation bars at the top and bottom of each page of output and does not generate index documents. This page can be displayed by selecting Index from any detail page's navigation bar. FIG. 32 depicts an index page, in accordance with embodiments of the present invention.

The open source XSL Formatting Objects (XSL-FO) specification, a W3C recommendation, is used to generate high-quality printable versions of the information catalog in portable document format (PDF) format. The compiler produces versions in both A4 (21×29.7 cm) and Letter (8.5×11 in) formats. XSL Stylesheets are used containing elements that:
1. Define page sizes, fonts, and margins
2. HTML to PDF conversions
3. Table of contents
4. Information Catalog specific pages (e.g. Overview summary, table details)

The present invention uses Apache XML Project's FOP (Formatting Objects to PDF) translator and a series of XSL Stylesheets to render the PDF documents.

Figure 33:
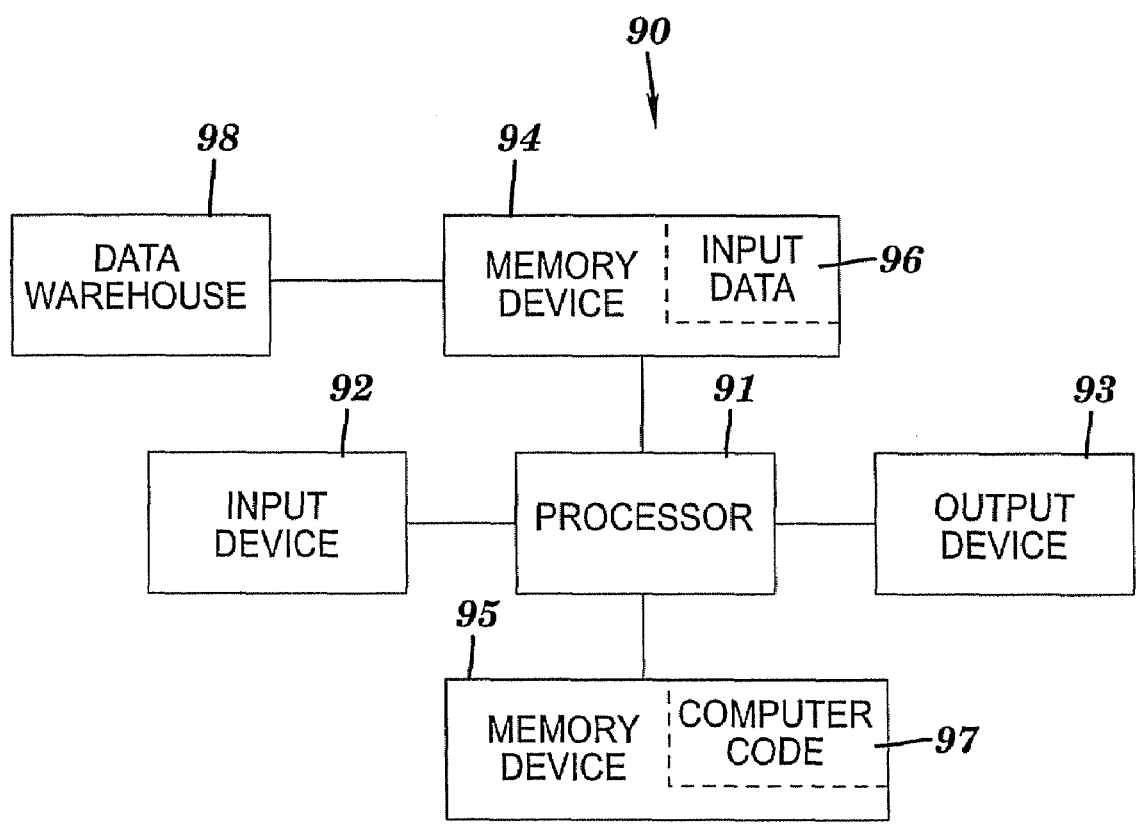
FIG. 33 illustrates a computer system used for generating an information catalog relating to a business model, in accordance with embodiments of the present invention.

FIG. 33 illustrates a computer system 90 used for generating an information catalog relating to a business model, in accordance with embodiments of the present invention. The computer system 90 comprises a processor 91, an input device 92 coupled to the processor 91, an output device 93 coupled to the processor 91, and memory devices 94 and 95 each coupled to the processor 91. The memory devices 94 and 95 are computer readable. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithm(s) or other computer readable program code (e.g., information catalog compiler) for generating an information catalog relating to a business model. The processor 91 executes the computer code 97. The memory device 94 includes input data 96. The memory device 94 includes or is coupled to a data warehouse 98 which may be embodied in the RDBMS 22 of FIGS. 3 and 4. The input data 96 includes input required by the computer code 97. The output device 93 displays output from the computer code 97 (e.g., the graphical interface of FIG. 13). Either or both memory devices 94 and 95 (or one or more additional memory devices not shown in FIG. 33) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 33 shows the computer system 90 as a particular configuration of hardware and software, any configuration of hardware and software, as would be known to a person of ordinary skill in the art, may be utilized for the purposes stated supra in conjunction with the particular computer system 90 of FIG. 33. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer system comprising a processor and a computer readable memory unit coupled to the processor, said memory unit including an information catalog compiler that when executed by the processor implements a method for generating an information catalog relating to a business model, said method comprising the computer implemented steps of:

accessing technical metadata from a data warehouse, said technical metadata being associated with data used by computer applications, said computer applications supporting business processes of the business model;

accessing business metadata from a first source outside of the data warehouse, said business metadata comprising relationships between the business processes and the computer applications, said business metadata further comprising relationships between the computer applications and the technical metadata;

accessing presentation metadata from a second source outside of the data warehouse, said second source being independent of the first source, said presentation metadata specifying a presentation format of the technical metadata and business metadata, wherein the second source comprises at least one eXtensible Stylesheet Language (XSL) stylesheet comprising the presentation metadata;

applying the presentation metadata to the technical metadata and the business metadata to generate the information catalog, said information catalog comprising the technical metadata and the business metadata in accordance with the presentation format specified by the presentation metadata; and displaying, on an output device for an end user, a graphical interface representing the generated information catalog, wherein the method further comprises generating a rules base of rules as templates derived from the presentation metadata in the at least one XSL stylesheet;

wherein prior to the applying step the method further comprises parsing the technical metadata and the business metadata to form a source tree such that the source tree comprises the parsed business metadata and parsed technical metadata logically linked to each other;

wherein the applying step comprises both applying the templates of the rules base and traversing the source tree to form a result tree that includes the logically linked technical metadata and business metadata integrated with the presentation metadata;

wherein the method further comprises transforming the result tree into the information catalog such that the information catalog comprises files formatted in accordance with the presentation metadata;

wherein traversing the source tree comprises traversing the entire source tree in accordance with a recursive descent algorithm in which said traversing comprises starting at the root node of the source tree and traversing through the source tree until a leaf node is reached and then returning through the source tree to the root node;

wherein said traversing the source tree comprises ascertaining whether there is a rule in the rules base for each element in the source tree;

wherein each element having exactly one rule in the rules base, as determined from said ascertaining, is written out in accordance with said exactly one rule during said displaying;

wherein each element having no rule in the rules base, as determined from said ascertaining, is written out as text during said displaying; and wherein for each element having more than one rule in the rules base, as determined from said ascertaining, one or more of said more than one rule is applied to said each element in accordance with a rule hierarchical scheme for determining how said each element is displayed during said displaying.

2. The computer system of claim 1 wherein the graphical interface includes a package list frame, an object list frame driven by the package list frame, and a detail frame driven by the object list frame, wherein the package list frame includes selectable applications of said computer applications and selectable associated table creators of tables relating to the technical data, wherein the object list frame is adapted to include selectable tables driven by a computer application and associated table creator selected from the package list frame, and wherein the detail frame is adapted to include table information relating to a table selected from the object list frame.

3. The computer system of claim 1, wherein the information catalog comprises result files selected from the group consisting of Hypertext Markup Language (HTML) files, PDF files, ZIP files, and combinations thereof.

4. The computer system of claim 1, wherein the first source comprises at least one eXtensible Markup Language (XML) file comprising the business metadata.

5. The computer system of claim 4, wherein the XML file includes well-formed HTML code.

6. The computer system of claim 1, wherein the data warehouse is a relational database management system, and wherein the technical data is stored in tables of the relational database management system.

7. The computer system of claim 1, said method further comprising accessing additional technical data from the first source; and wherein said applying step comprises applying the presentation metadata to the technical metadata, the business metadata, and the additional technical metadata to generate the information catalog.

8. A computer program product, comprising a computer usable medium having a computer readable program code embodied therein, said computer readable program code comprising an algorithm adapted to implement a method for generating an information catalog relating to a business model, said method comprising the steps of:

accessing technical metadata from a data warehouse, said technical metadata being associated with data used by computer applications, said computer applications supporting business processes of the business model;

accessing business metadata from a first source outside of the data warehouse, said business metadata comprising relationships between the business processes and the computer applications, said business metadata further comprising relationships between the computer applications and the technical metadata;

accessing presentation metadata from a second source outside of the data warehouse, said second source being independent of the first source, said presentation metadata specifying a presentation format of the technical metadata and business metadata, wherein the second source comprises at least one eXtensible Stylesheet Language (XSL) stylesheet comprising the presentation metadata;

applying the presentation metadata to the technical metadata and the business metadata to generate the information catalog, said information catalog comprising the technical metadata and the business metadata in accordance with the presentation format specified by the presentation metadata; and displaying, on an output device for an end user, a graphical interface representing the generated information catalog, wherein the method further comprises generating a rules base of rules as templates derived from the presentation metadata in the at least one XSL stylesheet;

wherein prior to the applying step the method further comprises parsing the technical metadata and the business metadata to form a source tree such that the source tree comprises the parsed business metadata and parsed technical metadata logically linked to each other;

wherein the applying step comprises both applying the templates of the rules base and traversing the source tree to form a result tree that includes the logically linked technical metadata and business metadata integrated with the presentation metadata;

wherein the method further comprises transforming the result tree into the information catalog such that the information catalog comprises files formatted in accordance with the presentation metadata;

wherein traversing the source tree comprises traversing the entire source tree in accordance with a recursive descent algorithm in which said traversing comprises starting at the root node of the source tree and traversing through the source tree until a leaf node is reached and then returning through the source tree to the root node;

wherein said traversing the source tree comprises ascertaining whether there is a rule in the rules base for each element in the source tree;

wherein each element having exactly one rule in the rules base, as determined from said ascertaining, is written out in accordance with said exactly one rule during said displaying;

wherein each element having no rule in the rules base, as determined from said ascertaining, is written out as text during said displaying; and wherein for each element having more than one rule in the rules base, as determined from said ascertaining, one or more of said more than one rule is applied to said each element in accordance with a rule hierarchical scheme for determining how said each element is displayed during said displaying.

9. The computer program product of claim 8 wherein the graphical interface includes a package list frame, an object list frame driven by the package list frame, and a detail frame driven by the object list frame, wherein the package list frame includes selectable applications of said computer applications and selectable associated table creators of tables relating to the technical data, wherein the object list frame is adapted to include selectable tables driven by a computer application and associated table creator selected from the package list frame, and wherein the detail frame is adapted to include table information relating to a table selected from the object list frame.

10. The computer program product of claim 8, wherein the information catalog comprises result files selected from the group consisting of Hypertext Markup Language (HTML) files, PDF files, ZIP files, and combinations thereof.

11. The computer program product of claim 8, wherein the first source comprises at least one eXtensible Markup Language (XML) file comprising the business metadata.

12. The computer program product of claim 11, wherein the XML file includes well-formed HTML code.

13. The computer program product of claim 8, wherein the data warehouse is a relational database management system, and wherein the technical data is stored in tables of the relational database management system.

14. The computer program product of claim 8, said method further comprising accessing additional technical data from the first source; and wherein said applying step comprises applying the presentation metadata to the technical metadata, the business metadata, and the additional technical metadata to generate the information catalog.

* * * * *